(12) United States Patent
Sun et al.

(10) Patent No.: US 11,356,873 B2
(45) Date of Patent: Jun. 7, 2022

(54) MONITORING FOR DOWNLINK (DL) CONTROL MESSAGES BASED ON MULTIPLE MONITORING DURATIONS

(71) Applicant: QUALCOMM Incorporated, San Diego, CA (US)

(72) Inventors: Jing Sun, San Diego, CA (US); Pravjyot Singh Deogun, Bangalore (IN); Kapil Bhattad, Bangalore (IN); Xiaoxia Zhang, San Diego, CA (US); Ozcan Ozturk, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 85 days.

(21) Appl. No.: 16/791,289

(22) Filed: Feb. 14, 2020

(65) Prior Publication Data
US 2020/0275294 A1 Aug. 27, 2020

(30) Foreign Application Priority Data

Feb. 22, 2019 (IN) .............................. 201941007088

(51) Int. Cl.
*H04W 24/08* (2009.01)
*H04W 74/08* (2009.01)
*H04W 72/04* (2009.01)

(52) U.S. Cl.
CPC ......... *H04W 24/08* (2013.01); *H04W 72/042* (2013.01); *H04W 74/0808* (2013.01)

(58) Field of Classification Search
CPC ............. H04W 24/08; H04W 74/0808; H04W 72/042; H04W 52/0229; H04W 24/02;
(Continued)

(56) References Cited

U.S. PATENT DOCUMENTS

| 2009/0238105 A1* | 9/2009 | Wu | H04W 52/0216 370/311 |
| 2015/0098452 A1* | 4/2015 | Dalsgaard | H04W 24/08 370/336 |

(Continued)

FOREIGN PATENT DOCUMENTS

WO 2018232123 A1 12/2018

OTHER PUBLICATIONS

Ericsson: "Remaining Details on RACH Procedure", 3GPP Draft, 3GPP TSG RAN WG1 Meeting #91, R1-1720941_Remaining Details on RACH Procedure, 3rd Generation Partnership Project (3GPP), Mobile Competence Centre, 650, Route Des Lucioles, F-06921 Sophia-Antipolis Cedex, France, vol. RAN WG1, No. Reno, Nevada, US, Nov. 27, 2017-Dec. 1, 2017, Nov. 18, 2017, XP051370315, 24 pages, Retrieved from the Internet: URL: http://www.3gpp.org/ftp/tsg%5Fran/WG1%5FRL1/TSGR1%5F91/Docs/, [retrieved on Nov. 18, 2017], Section 3.2.

(Continued)

*Primary Examiner* — Michael K Phillips
(74) *Attorney, Agent, or Firm* — Liem T. Do

(57) ABSTRACT

Wireless communications systems and methods related to DL control message monitoring are provided. A first wireless communication device monitors for a downlink control message from a base station during a first monitoring duration. Additionally, the first wireless communication device monitors for a network activity indication signal from the base station during the first monitoring duration. The first wireless communication device detects the network activity indication signal based on the monitoring of the network activity indication signal. The first wireless communication device switches from the first monitoring duration to a second monitoring duration for the monitoring of the down- (Continued)

link control message in response to detecting the network activity indication signal.

30 Claims, 12 Drawing Sheets

(58) Field of Classification Search
CPC ..... H04W 48/12; H04W 76/28; H04W 16/14; H04W 72/0446; H04W 72/04; H04W 74/0833; H04W 72/044; H04L 5/0053; H04L 5/0096; H04L 5/0082; Y02D 30/70
See application file for complete search history.

(56) References Cited

U.S. PATENT DOCUMENTS

| | | | |
|---|---|---|---|
| 2017/0231011 A1 | 8/2017 | Park et al. | |
| 2017/0251499 A1* | 8/2017 | Radulescu | H04L 41/0866 |
| 2018/0324847 A1* | 11/2018 | Lun | H04W 76/28 |
| 2019/0021105 A1* | 1/2019 | Hamidi-Sepehr | H04W 72/1268 |
| 2019/0230590 A1* | 7/2019 | Wu | H04W 52/0209 |
| 2019/0261287 A1* | 8/2019 | Deenoo | H04W 24/08 |
| 2019/0357262 A1* | 11/2019 | Cirik | H04W 76/27 |
| 2020/0037354 A1* | 1/2020 | Li | H04W 74/0808 |
| 2020/0037396 A1* | 1/2020 | Islam | H04W 76/27 |
| 2020/0092861 A1* | 3/2020 | Xu | H04L 5/0032 |
| 2020/0145972 A1* | 5/2020 | Kwak | H04W 72/042 |
| 2020/0275474 A1* | 8/2020 | Chen | H04L 1/08 |
| 2020/0351847 A1* | 11/2020 | Kim | H04W 72/0446 |
| 2021/0092768 A1* | 3/2021 | Kim | H04L 5/0053 |

OTHER PUBLICATIONS

International Search Report and Written Opinion—PCT/US2020/018522—ISAEPO—dated Apr. 23, 2020.
LG Electronics Inc: "Considerations for RA-RNTI Calculation", 3GPP Draft, 3GPP TSG-RAN WG2 Meeting #100, A2-1713633 Considerations for RA-RNTI Calculation, 3rd Generation Partnership Project (3GPP), Mobile Competence Centre, 650, Route Des Lucioles, F-06921, Sophia-Antipolis Cedex, France, vol. RAN WG2, No. Reno, USA, Nov. 27, 2017-Dec. 1, 2017, Nov. 17, 2017 (Nov. 17, 2017), XP051372301, pp. 1-4, Retrieved from the Internet: URL: http://www.3gpp.org/ftp/tsg%5Fran/WG2%5FRL2/TSGR2%5F100/Docs/, [retrieved on Nov. 17, 2017], 2.

* cited by examiner

MONITORING FOR DOWNLINK (DL) CONTROL MESSAGES BASED ON MULTIPLE MONITORING DURATIONS

CROSS REFERENCE TO RELATED APPLICATIONS & PRIORITY CLAIM

The present application claims priority to and the benefit of the Indian Provisional Patent Application No. 201941007088 filed Feb. 22, 2019, which is hereby incorporated by reference in its entirety.

TECHNICAL FIELD

This application relates to wireless communication systems, and more particularly to monitoring for PDCCH based on multiple monitoring durations.

INTRODUCTION

Wireless communications systems are widely deployed to provide various types of communication content such as voice, video, packet data, messaging, broadcast, and so on. These systems may be capable of supporting communication with multiple users by sharing the available system resources (e.g., time, frequency, and power). A wireless multiple-access communications system may include a number of base stations (BSs), each simultaneously supporting communications for multiple communication devices, which may be otherwise known as user equipment (UE).

To meet the growing demands for expanded mobile broadband connectivity, wireless communication technologies are advancing from the LTE technology to a next generation new radio (NR) technology. For example, NR is designed to provide a lower latency, a higher bandwidth or throughput, and a higher reliability than LTE. NR is designed to operate over a wide array of spectrum bands, for example, from low-frequency bands below about 1 gigahertz (GHz) and mid-frequency bands from about 1 GHz to about 6 GHz, to high-frequency bands such as millimeter wave (mmWave) bands. NR is also designed to operate across different spectrum types, from licensed spectrum to unlicensed and shared spectrum. Spectrum sharing enables operators to opportunistically aggregate spectrums to dynamically support high-bandwidth services. Spectrum sharing can extend the benefit of NR technologies to operating entities that may not have access to a licensed spectrum.

One approach to avoiding collisions when communicating in a shared spectrum or an unlicensed spectrum is to use a listen-before-talk (LBT) procedure to ensure that the shared channel is clear before transmitting a signal in the shared channel. For example, a transmitting node may listen to the channel to determine whether there are active transmissions in the channel. When the channel is idle, the transmitting node may transmit a preamble to reserve a transmission opportunity (TXOP) in the shared channel and may communicate with a receiving node during the TXOP.

BRIEF SUMMARY OF SOME EXAMPLES

The following summarizes some aspects of the present disclosure to provide a basic understanding of the discussed technology. This summary is not an extensive overview of all contemplated features of the disclosure, and is intended neither to identify key or critical elements of all aspects of the disclosure nor to delineate the scope of any or all aspects of the disclosure. Its sole purpose is to present some concepts of one or more aspects of the disclosure in summary form as a prelude to the more detailed description that is presented later.

For example, in an aspect of the disclosure, a method of wireless communication includes monitoring, by a wireless communication device, for a downlink control message from a base station during a first monitoring duration; monitoring, by the wireless communication device, for a network activity indication signal from the base station during the first monitoring duration; detecting, by the wireless communication device, the network activity indication signal based on the monitoring of the network activity indication signal; and switching, by the wireless communication device, from the first monitoring duration to a second monitoring duration for the monitoring of the downlink control message in response to detecting the network activity indication signal.

In an additional aspect of the disclosure, an apparatus includes a processor configured to monitor for a downlink control message from a base station during a first monitoring duration; monitor for a network activity indication signal from the base station during the first monitoring duration; detect the network activity indication signal based on the monitoring of the network activity indication signal; and switch from the first monitoring duration to a second monitoring duration for the monitoring of the downlink control message in response to detection of the network activity indication signal.

In an additional aspect of the disclosure, for a computer-readable medium having program code recorded thereon, the program code includes code for causing a first wireless communication device to monitor for a downlink control message from a base station during a first monitoring duration; code for causing the first wireless communication device to monitor for a network activity indication signal from the base station during the first monitoring duration; code for causing the first wireless communication device to detect the network activity indication signal based on the monitoring of the network activity indication signal; and code for causing the first wireless communication device to switch from the first monitoring duration to a second monitoring duration for the monitoring of the downlink control message in response to detecting the network activity indication signal.

In an additional aspect of the disclosure, an apparatus includes means for monitoring for a downlink control message from a base station during a first monitoring duration; means for monitoring for a network activity indication signal from the base station during the first monitoring duration; means for detecting the network activity indication signal based on the monitoring of the network activity indication signal; and means for switching from the first monitoring duration to a second monitoring duration for the monitoring of the downlink control message in response to detecting the network activity indication signal.

In an aspect of the disclosure, a method of wireless communication includes transmitting, by a base station to a wireless communication device, configuration information for switching of a downlink control message monitoring duration; and communicating, by the base station with the wireless communication device, a communication signal based on the configuration information.

In an additional aspect of the disclosure, an apparatus includes a transceiver configured to transmit to a wireless communication device, configuration information for switching of a downlink control message monitoring duration; and communicate, with the wireless communication device, a communication signal based on the configuration information.

In an additional aspect of the disclosure, for a computer-readable medium having program code recorded thereon, the program code includes code for causing a second wireless communication device to transmit to a first wireless communication device, configuration information for switching of a downlink control message monitoring duration; and code for causing the second wireless communication device to communicate, with the first wireless communication device, a communication signal based on the configuration information.

In an additional aspect of the disclosure, an apparatus includes means for transmitting, to a wireless communication device, configuration information for switching of a downlink control message monitoring duration; and means for communicating, with the wireless communication device, a communication signal based on the configuration information.

Other aspects, features, and embodiments of the present disclosure will become apparent to those of ordinary skill in the art, upon reviewing the following description of specific, example embodiments of the present disclosure in conjunction with the accompanying figures. While features of the present disclosure may be discussed relative to certain embodiments and figures below, all embodiments of the present disclosure can include one or more of the advantageous features discussed herein. In other words, while one or more embodiments may be discussed as having certain advantageous features, one or more of such features may also be used in accordance with the various embodiments of the disclosure discussed herein. In similar fashion, while example embodiments may be discussed below as device, system, or method embodiments it should be understood that such example embodiments can be implemented in various devices, systems, and methods.

DETAILED DESCRIPTION

Figure 1:
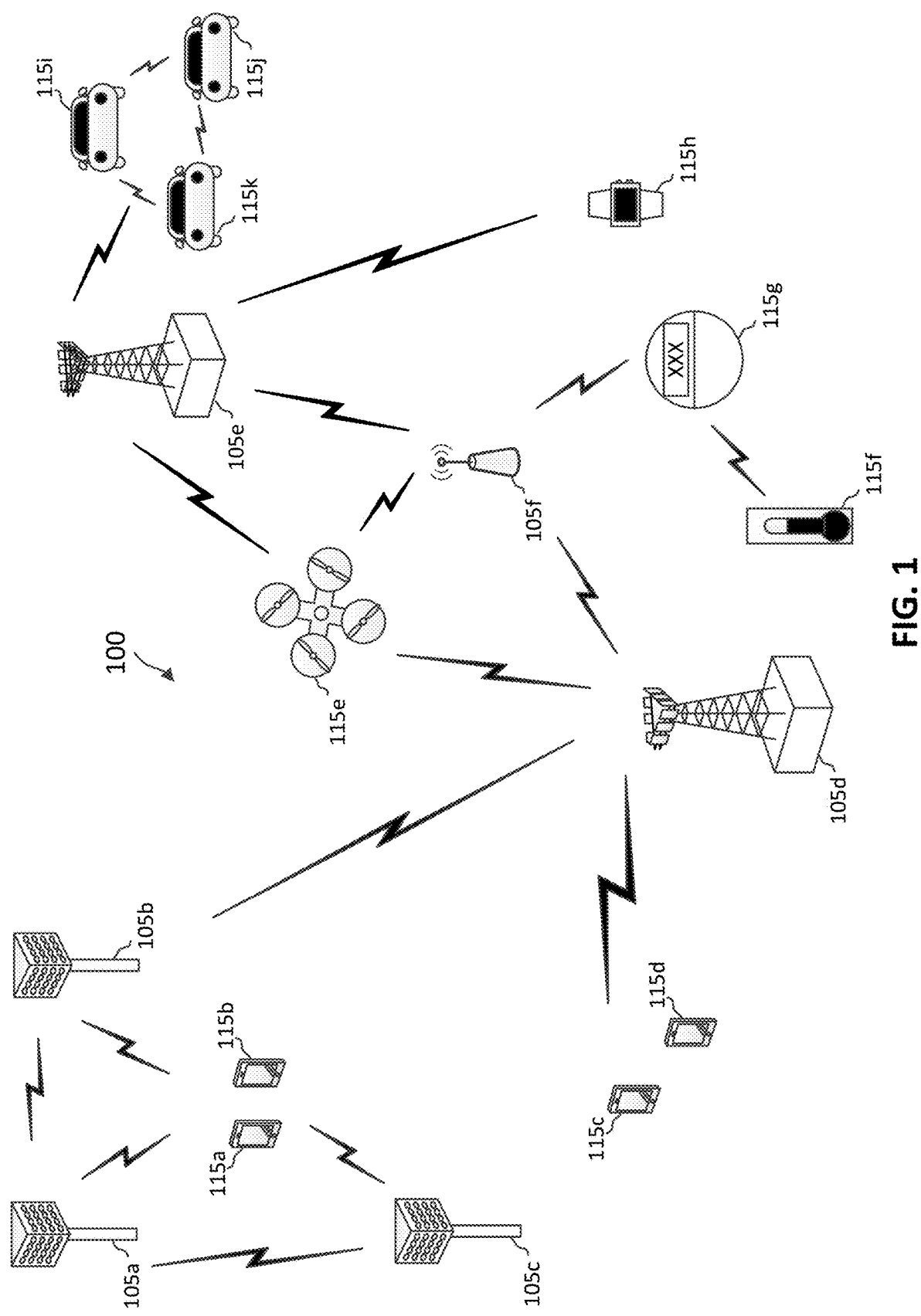
FIG. 1 illustrates a wireless communication network according to some embodiments of the present disclosure.

The detailed description set forth below, in connection with the appended drawings, is intended as a description of various configurations and is not intended to represent the only configurations in which the concepts described herein may be practiced. The detailed description includes specific details for the purpose of providing a thorough understanding of the various concepts. However, it will be apparent to those skilled in the art that these concepts may be practiced without these specific details. In some instances, well-known structures and components are shown in block diagram form in order to avoid obscuring such concepts.

This disclosure relates generally to wireless communications systems, also referred to as wireless communications networks. In various embodiments, the techniques and apparatus may be used for wireless communication networks such as code division multiple access (CDMA) networks, time division multiple access (TDMA) networks, frequency division multiple access (FDMA) networks, orthogonal FDMA (OFDMA) networks, single-carrier FDMA (SC-FDMA) networks, LTE networks, GSM networks, $5^{th}$ Generation (5G) or new radio (NR) networks, as well as other communications networks. As described herein, the terms "networks" and "systems" may be used interchangeably.

An OFDMA network may implement a radio technology such as evolved UTRA (E-UTRA), IEEE 802.11, IEEE 802.16, IEEE 802.20, flash-OFDM and the like. UTRA, E-UTRA, and Global System for Mobile Communications (GSM) are part of universal mobile telecommunication system (UMTS). In particular, long term evolution (LTE) is a release of UMTS that uses E-UTRA. UTRA, E-UTRA, GSM, UMTS and LTE are described in documents provided from an organization named "3rd Generation Partnership Project" (3GPP), and cdma2000 is described in documents from an organization named "3rd Generation Partnership Project 2" (3GPP2). These various radio technologies and standards are known or are being developed. For example, the 3rd Generation Partnership Project (3GPP) is a collaboration between groups of telecommunications associations that aims to define a globally applicable third generation (3G) mobile phone specification. 3GPP long term evolution (LTE) is a 3GPP project which was aimed at improving the universal mobile telecommunications system (UMTS)

mobile phone standard. The 3GPP may define specifications for the next generation of mobile networks, mobile systems, and mobile devices. The present disclosure is concerned with the evolution of wireless technologies from LTE, 4G, 5G, NR, and beyond with shared access to wireless spectrum between networks using a collection of new and different radio access technologies or radio air interfaces.

In particular, 5G networks contemplate diverse deployments, diverse spectrum, and diverse services and devices that may be implemented using an OFDM-based unified, air interface. In order to achieve these goals, further enhancements to LTE and LTE-A are considered in addition to development of the new radio technology for 5G NR networks. The 5G NR will be capable of scaling to provide coverage (1) to a massive Internet of things (IoTs) with an ultra-high density (e.g., ~1M nodes/km$^2$), ultra-low complexity (e.g., ~10s of bits/sec), ultra-low energy (e.g., ~10+ years of battery life), and deep coverage with the capability to reach challenging locations; (2) including mission-critical control with strong security to safeguard sensitive personal, financial, or classified information, ultra-high reliability (e.g., ~99.9999% reliability), ultra-low latency (e.g., ~1 ms), and users with wide ranges of mobility or lack thereof; and (3) with enhanced mobile broadband including extreme high capacity (e.g., ~10 Tbps/km$^2$), extreme data rates (e.g., multi-Gbps rate, 100+ Mbps user experienced rates), and deep awareness with advanced discovery and optimizations.

The 5G NR may be implemented to use optimized OFDM-based waveforms with scalable numerology and transmission time intervals (TTIs); having a common, flexible framework to efficiently multiplex services and features with a dynamic, low-latency time division duplex (TDD)/frequency division duplex (FDD) design; and with advanced wireless technologies, such as massive multiple input, multiple output (MIMO), robust millimeter wave (mmWave) transmissions, advanced channel coding, and device-centric mobility. Scalability of the numerology in 5G NR, with scaling of subcarrier spacing, may efficiently address operating diverse services across diverse spectrum and diverse deployments. For example, in various outdoor and macro coverage deployments of less than 3 GHz FDD/TDD implementations, subcarrier spacing may occur with 15 kHz, for example over 1, 5, 10, 20 MHz, and the like BW. For other various outdoor and small cell coverage deployments of TDD greater than 3 GHz, subcarrier spacing may occur with 30 kHz over 80/100 MHz BW. For other various indoor wideband implementations, using a TDD over the unlicensed portion of the 5 GHz band, the subcarrier spacing may occur with 60 kHz over a 160 MHz BW. Finally, for various deployments transmitting with mmWave components at a TDD of 28 GHz, subcarrier spacing may occur with 120 kHz over a 500 MHz BW.

The scalable numerology of the 5G NR facilitates scalable TTI for diverse latency and quality of service (QoS) requirements. For example, shorter TTI may be used for low latency and high reliability, while longer TTI may be used for higher spectral efficiency. The efficient multiplexing of long and short TTIs to allow transmissions to start on symbol boundaries. 5G NR also contemplates a self-contained integrated subframe design with uplink (UL)/downlink (DL) scheduling information, data, and acknowledgement in the same subframe. The self-contained integrated subframe supports communications in unlicensed or contention-based shared spectrum, adaptive UL/DL that may be flexibly configured on a per-cell basis to dynamically switch between UL and DL to meet the current traffic needs.

Various other aspects and features of the disclosure are further described below. It should be apparent that the teachings herein may be embodied in a wide variety of forms and that any specific structure, function, or both being disclosed herein is merely representative and not limiting. Based on the teachings herein one of an ordinary level of skill in the art should appreciate that an aspect disclosed herein may be implemented independently of any other aspects and that two or more of these aspects may be combined in various ways. For example, an apparatus may be implemented or a method may be practiced using any number of the aspects set forth herein. In addition, such an apparatus may be implemented or such a method may be practiced using other structure, functionality, or structure and functionality in addition to or other than one or more of the aspects set forth herein. For example, a method may be implemented as part of a system, device, apparatus, and/or as instructions stored on a computer readable medium for execution on a processor or computer. Furthermore, an aspect may includes at least one element of a claim.

FIG. 1 illustrates a wireless communication network 100 according to some embodiments of the present disclosure. The network 100 may be a 5G network. The network 100 includes a number of base stations (BSs) 105 and other network entities. A BS 105 may be a station that communicates with UEs 115 and may also be referred to as an evolved node B (eNB), a next generation eNB (gNB), an access point, and the like. Each BS 105 may provide communication coverage for a particular geographic area. In 3GPP, the term "cell" can refer to this particular geographic coverage area of a BS 105 and/or a BS subsystem serving the coverage area, depending on the context in which the term is used.

A BS 105 may provide communication coverage for a macro cell or a small cell, such as a pico cell or a femto cell, and/or other types of cell. A macro cell generally covers a relatively large geographic area (e.g., several kilometers in radius) and may allow unrestricted access by UEs with service subscriptions with the network provider. A small cell, such as a pico cell, would generally cover a relatively smaller geographic area and may allow unrestricted access by UEs with service subscriptions with the network provider. A small cell, such as a femto cell, would also generally cover a relatively small geographic area (e.g., a home) and, in addition to unrestricted access, may also provide restricted access by UEs having an association with the femto cell (e.g., UEs in a closed subscriber group (CSG), UEs for users in the home, and the like). A BS for a macro cell may be referred to as a macro BS. A BS for a small cell may be referred to as a small cell BS, a pico BS, a femto BS or a home BS. In the example shown in FIG. 1, the BSs 105d and 105e may be regular macro BSs, while the BSs 105a-105c may be macro BSs enabled with one of three dimension (3D), full dimension (FD), or massive MIMO. The BSs 105a-105c may take advantage of their higher dimension MIMO capabilities to exploit 3D beamforming in both elevation and azimuth beamforming to increase coverage and capacity. The BS 105f may be a small cell BS which may be a home node or portable access point. A BS 105 may support one or multiple (e.g., two, three, four, and the like) cells.

The network 100 may support synchronous or asynchronous operation. For synchronous operation, the BSs may have similar frame timing, and transmissions from different BSs may be approximately aligned in time. For asynchronous operation, the BSs may have different frame timing, and transmissions from different BSs may not be aligned in time.

The UEs 115 are dispersed throughout the wireless network 100, and each UE 115 may be stationary or mobile. A UE 115 may also be referred to as a terminal, a mobile station, a subscriber unit, a station, or the like. A UE 115 may be a cellular phone, a personal digital assistant (PDA), a wireless modem, a wireless communication device, a handheld device, a tablet computer, a laptop computer, a cordless phone, a wireless local loop (WLL) station, or the like. In one aspect, a UE 115 may be a device that includes a Universal Integrated Circuit Card (UICC). In another aspect, a UE may be a device that does not include a UICC. In some aspects, the UEs 115 that do not include UICCs may also be referred to as IoT devices or internet of everything (IoE) devices. The UEs 115a-115d are examples of mobile smart phone-type devices accessing network 100 A UE 115 may also be a machine specifically configured for connected communication, including machine type communication (MTC), enhanced MTC (eMTC), narrowband IoT (NB-IoT) and the like. The UEs 115e-115k are examples of various machines configured for communication that access the network 100. A UE 115 may be able to communicate with any type of the BSs, whether macro BS, small cell, or the like. In FIG. 1, a lightning bolt (e.g., communication links) indicates wireless transmissions between a UE 115 and a serving BS 105, which is a BS designated to serve the UE 115 on the DL and/or UL, or desired transmission between BSs, and backhaul transmissions between BSs.

In operation, the BSs 105a-105c may serve the UEs 115a and 115b using 3D beamforming and coordinated spatial techniques, such as coordinated multipoint (CoMP) or multi-connectivity. The macro BS 105d may perform backhaul communications with the BSs 105a-105c, as well as with the small cell, the BS 105f. The macro BS 105d may also transmit multicast services which are subscribed to and received by the UEs 115c and 115d. Such multicast services may include mobile television or stream video, or may include other services for providing community information, such as weather emergencies or alerts, such as Amber alerts or gray alerts.

The network 100 may also support mission critical communications with ultra-reliable and redundant links for mission critical devices, such as the UE 115e, which may be a drone. Redundant communication links with the UE 115e may include links from the macro BSs 105d and 105e, as well as links from the small cell BS 105f. Other machine type devices, such as the UE 115f (e.g., a thermometer), the UE 115g (e.g., smart meter), and UE 115h (e.g., wearable device) may communicate through the network 100 either directly with BSs, such as the small cell BS 105f, and the macro BS 105e, or in multi-hop configurations by communicating with another user device which relays its information to the network, such as the UE 115f communicating temperature measurement information to the smart meter, the UE 115g, which is then reported to the network through the small cell BS 105f. The network 100 may also provide additional network efficiency through dynamic, low-latency TDD/FDD communications, such as in a vehicle-to-vehicle (V2V).

In some implementations, the network 100 utilizes OFDM-based waveforms for communications. An OFDM-based system may partition the system BW into multiple (K) orthogonal subcarriers, which are also commonly referred to as subcarriers, tones, bins, or the like. Each subcarrier may be modulated with data. In some instances, the subcarrier spacing between adjacent subcarriers may be fixed, and the total number of subcarriers (K) may be dependent on the system BW. The system BW may also be partitioned into subbands. In other instances, the subcarrier spacing and/or the duration of TTIs may be scalable.

In an embodiment, the BSs 105 can assign or schedule transmission resources (e.g., in the form of time-frequency resource blocks (RB)) for DL and UL transmissions in the network 100. DL refers to the transmission direction from a BS 105 to a UE 115, whereas UL refers to the transmission direction from a UE 115 to a BS 105. The communication can be in the form of radio frames. A radio frame may be divided into a plurality of subframes, for example, about 10. Each subframe can be divided into slots, for example, about 2. Each slot may be further divided into mini-slots. In a FDD mode, simultaneous UL and DL transmissions may occur in different frequency bands. For example, each subframe includes a UL subframe in a UL frequency band and a DL subframe in a DL frequency band. In a TDD mode, UL and DL transmissions occur at different time periods using the same frequency band. For example, a subset of the subframes (e.g., DL subframes) in a radio frame may be used for DL transmissions and another subset of the subframes (e.g., UL subframes) in the radio frame may be used for UL transmissions.

The DL subframes and the UL subframes can be further divided into several regions. For example, each DL or UL subframe may have pre-defined regions for transmissions of reference signals, control information, and data. Reference signals are predetermined signals that facilitate the communications between the BSs 105 and the UEs 115. For example, a reference signal can have a particular pilot pattern or structure, where pilot tones may span across an operational BW or frequency band, each positioned at a pre-defined time and a pre-defined frequency. For example, a BS 105 may transmit cell specific reference signals (CRSs) and/or channel state information-reference signals (CSI-RSs) to enable a UE 115 to estimate a DL channel. Similarly, a UE 115 may transmit sounding reference signals (SRSs) to enable a BS 105 to estimate a UL channel Control information may include resource assignments and protocol controls. Data may include protocol data and/or operational data. In some embodiments, the BSs 105 and the UEs 115 may communicate using self-contained subframes. A self-contained subframe may include a portion for DL communication and a portion for UL communication. A self-contained subframe can be DL-centric or UL-centric. A DL-centric subframe may include a longer duration for DL communication than for UL communication. A UL-centric subframe may include a longer duration for UL communication than for DL communication.

After establishing a connection, the UE 115 and the BS 105 can enter a normal operation stage, where operational data may be exchanged. For example, the BS 105 may schedule the UE 115 for UL and/or DL communications. The BS 105 may transmit UL and/or DL scheduling grants to the UE 115 via a physical DL control channel (PDCCH). The BS 105 may transmit a DL communication signal to the UE 115 via a physical DL shared channel (PDSCH) according to a DL scheduling grant. The UE 115 may transmit a UL communication signal to the BS 105 via a physical UL shared channel (PUSCH) and/or physical UL control channel (PUCCH) according to a UL scheduling grant.

The BSs 105 can transmit synchronization signals (e.g., including a primary synchronization signal (PSS) and a secondary synchronization signal (SSS)) in the network 100 to facilitate synchronization. The BSs 105 can broadcast system information associated with the network 100 (e.g., including a master information block (MIB), remaining minimum system information (RMSI), and other system information (OSI)) to facilitate initial network access. In some instances, the BSs 105 may broadcast the PSS, the SSS, and/or the MIB in the form of synchronization signal blocks (SSBs) over a physical broadcast channel (PBCH) and may broadcast the RMSI and/or the OSI over a physical downlink shared channel (PDSCH).

In an embodiment, a UE 115 attempting to access the network 100 may perform an initial cell search by detecting a PSS from a BS 105. The PSS may enable synchronization of period timing and may indicate a physical layer identity value. The UE 115 may then receive a SSS. The SSS may enable radio frame synchronization, and may provide a cell identity value, which may be combined with the physical layer identity value to identify the cell. The SSS may also enable detection of a duplexing mode and a cyclic prefix length. Both the PSS and the SSS may be located in a central portion of a carrier, respectively.

After receiving the PSS and SSS, the UE 115 may receive a MIB. The MIB may include system information for initial network access and scheduling information for RMSI and/or OSI. After decoding the MIB, the UE 115 may receive RMSI and/or OSI. The RMSI and/or OSI may include radio resource control (RRC) information related to random access channel (RACH) procedures, paging, control resource set (CORESET) for PDCCH monitoring, PUCCH, PUSCH, power control, SRS, and cell barring.

After obtaining the MIB, the RMSI and/or the OSI, the UE 115 can perform a random access procedure to establish a connection with the BS 105. After establishing the connection, the UE 115 and the BS 105 can enter a normal operation stage, where operational data may be exchanged. For example, the BS 105 may schedule the UE 115 for UL and/or DL communications. The BS 105 may transmit UL and/or DL scheduling grants to the UE 115 via a PDCCH. The BS 105 may transmit a DL communication signal to the UE 115 via a PDSCH according to a DL scheduling grant. The UE 115 may transmit a UL communication signal to the BS 105 via a PUSCH and/or PUCCH according to a UL scheduling grant.

In an embodiment, the network 100 may be an NR network deployed over a licensed or unlicensed spectrum. The network 100 may operate over a shared channel, which may include shared frequency bands or unlicensed frequency bands, for example, at about 3.5 gigahertz (GHz), sub-6 GHz or higher frequencies in the mmWav band. In such an embodiment, a wireless communication device may share resources in the shared communication medium and may employ a listen-before-talk (LBT) procedure to reserve transmission opportunities (TXOPs) in the shared medium for communications. TXOPs may be non-continuous in time and may refer to an amount of time a station can send frames when it has won contention for the wireless medium. Each TXOP may include a plurality of slots and one or more medium sensing periods. A TXOP may also be referred to as channel occupancy time (COT).

A wireless communication device may perform an LBT in the shared channel. LBT is a channel access scheme that may be used in the unlicensed spectrum. When the LBT results in an LBT pass (the wireless communication device wins contention for the wireless medium), the wireless communication device may access the shared medium to transmit and/or receive data. In an example, the BS 105 may perform an LBT in a frequency band prior to transmitting in the frequency band and may transmit in one or more channels based on the LBT result. If the channel is available (performance of the LBT results in a LBT pass), the BS 105 may perform a DL transmission, receive a UL transmission from the UE 115, and/or schedule the UE 115 for data transmission and/or reception within a TXOP. If the channel is not available (performance of the LBT results in a LBT fail), the BS 105 may back off and perform the LBT procedure again at a later point in time. In another example, the UE 115 may perform an LBT in the frequency band prior to transmitting in the frequency band and may transmit in one or more channels based on the LBT result. If the channel is available (performance of the LBT results in a LBT pass), the UE 115 may perform an UL transmission or receive a DL transmission from the BS 105. If the channel is not available (performance of the LBT results in a LBT fail), the UE 115 may back off and perform the LBT procedure again at a later point in time.

The failure to acquire a channel has been considered to be one of the major drawbacks of using an unlicensed channel for QoS-based services. For example, a paging procedure may direct an incoming message to a UE at regular intervals when it is in an idle mode to conserve energy. The BS 105 is subject to the LBT constraint and performs the LBT prior to transmitting the paging message to the UE 115. In another example, the UE 115 may initiate a random access procedure by transmitting a RACH preamble to the BS 105. In response to receiving the RACH preamble, the BS 105 may send a random access response (RAR) message to the UE 115. The BS 105 is subject to the LBT constraint and performs the LBT prior to transmitting the RAR message to the UE 115. Accordingly, various network transmissions (e.g., paging, random access procedure, etc.) may be delayed due to consistent LBT failures, resulting in unreliable transmission and reception of data.

To receive these messages from the BS 105, the UE 115 may trigger a timer for a monitoring duration. While the timer is running, the UE 115 may continuously perform PDCCH monitoring. If the UE 115 receives the intended PDCCH transmission, the UE 115 may stop the timer and return to sleep. If the UE 115 does not receive the intended PDCCH transmission by the expiry of the monitoring duration, the UE 115 may initiate the failure procedures for the aspect specific to each procedure.

The UE 115 may not receive PDCCH during the monitoring duration for various reasons. For example, if performance of the LBT by the BS 105 for PDCCH transmission results in an LBT fail, the BS 105 does not acquire the channel and may back-off. During the back-off period in which the BS 105 is unable to transmit the PDCCH, the UE 115 may continue to monitor the channel for PDCCH. In another example, the BS 105 has not scheduled a PDCCH transmission for the UE 115, resulting in the UE 115 not receiving PDCCH. In this example, the BS 105 may have failed to decode an UL transmission (e.g., RACH) for which the PDCCH is transmitted, or no messages (e.g., paging messages) may have been scheduled for the UE 115. In another example, the UE 115 may fail to detect the PDCCH. In this example, the BS 105 transmitted the PDCCH, but the UE 115 was unable to decode the PDCCH. The UE 115 may have been unable to decode the PDCCH due to extra interference at the UE-side or due to low transmit power at the BS-side.

To account for the above problems, the UE 115 may monitor for a longer duration of time for PDCCH. The BS 105 may configure the length of a PDCCH monitoring duration for the UE 115. A length of a monitoring duration may depend on, for example, a number of LBT failures expected by the BS 105 for transmission of a message (e.g., RAR message). Such long PDCCH monitoring durations, however, may result in higher power consumption for the UE 115. The UE 115 consumes power when monitoring for PDCCH. Additionally, the LBT failures may result in poor performance due to network latency. It may be desirable to improve UE power consumption and reduce the latency of transmissions, while ensuring reliability of procedures.

The UE 115 may leverage knowledge that it has regarding the network operation to reduce the PDCCH monitoring duration. For example, if the UE 115 detects a network transmission during its PDCCH monitoring duration, the UE 115 may imply that the BS 105 was able to acquire the channel. The UE 115 may continue to monitor the channel for an amount of time after detecting the network transmission to allow the BS 105 to schedule a message for and transmit the message to the UE 115. If the UE 115 does not detect a transmission from the BS 105 during this amount of time, it may be likely that no PDCCH transmissions are scheduled for the UE 115 or that the UE 115 failed to detect the PDCCH. In either of these cases, it may be undesirable for the UE 115 to extend the monitoring duration for monitoring for a DL control message.

Figure 2:
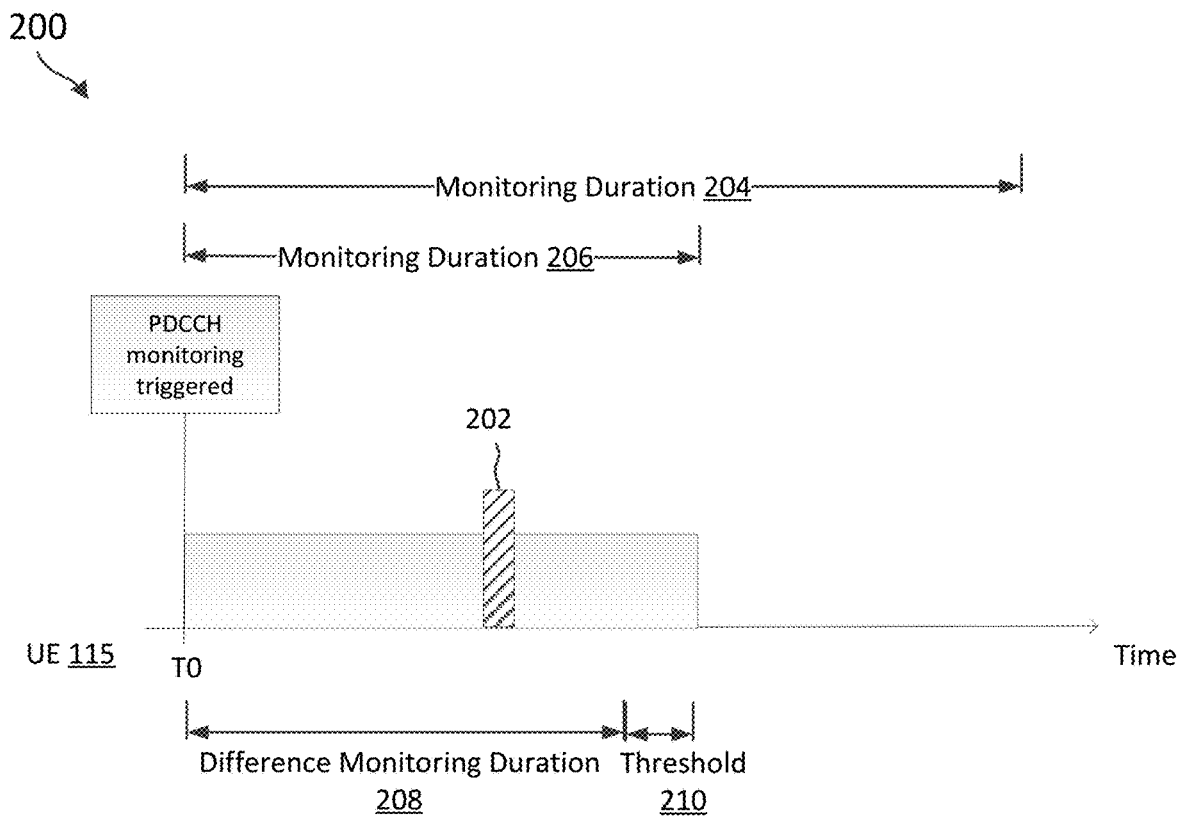
FIG. 2 illustrates a communication scheme for downlink (DL) control message monitoring according to some embodiments of the present disclosure.
Figure 3:
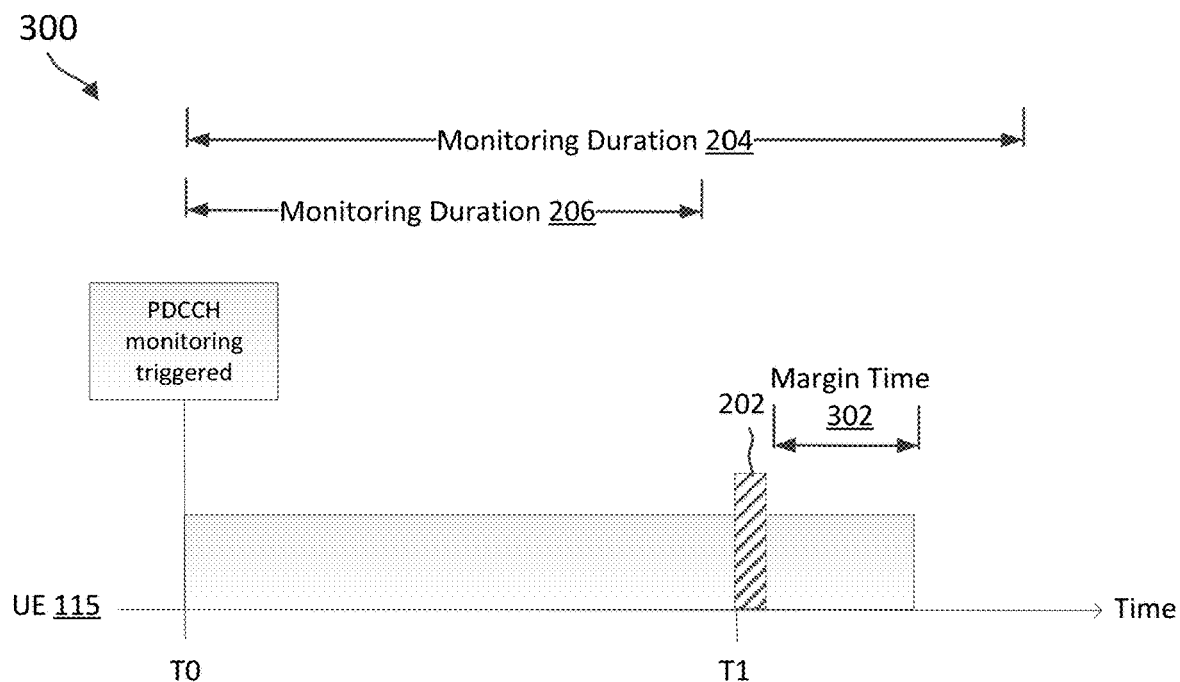
FIG. 3 illustrates a communication scheme for DL control message monitoring according to some embodiments of the present disclosure.

In FIGS. 2 and 3, the UE 115 performs PDCCH monitoring based on network activity. FIG. 2 illustrates a communication scheme 200 for monitoring for a DL control message according to some embodiments of the present disclosure. The communication scheme 200 may correspond to a communication scheme between a BS 105 and a UE 115 of the network 100. In FIG. 2, the x-axis represents time in some constant units. A BS may communicate with a UE in units of slots. The slots may also be referred to as TTIs. Each slot or TTI carries a medium access control (MAC) layer transport block. Each slot may include a number of symbols in time and a number of frequency tones in frequency. Each slot may include a DL control portion followed by at least one of a subsequent DL data portion, UL data portion, and/or a UL control portion. In the context of LTE or NR, the DL control portion, the DL data portion, the UL data portion, and the UL control portion may be referred to as a PDCCH, a PDSCH, a PUSCH, and a PUCCH, respectively.

In the example illustrated in FIG. 2, the UE 115 may use two different timers for monitoring PDCCH. A timer may be configured with an expiration duration corresponding to a monitoring duration. At time T0, the UE 115 configures a timer with an expiration duration corresponding to a monitoring duration 204 and initiates or starts the timer for PDCCH monitoring. The monitoring duration 204 is longer than the monitoring duration 206.

Staring at time T0, the UE 115 may monitor a channel for a DL control message from the BS 105 during the monitoring duration 204. The monitoring duration 204 may correspond to any timer that is used for monitoring PDCCH or any other DL control transmission. The timer may be, for example, a DRX timer (e.g., inactivity timer, on duration timer, retransmission timer), paging window, or RAR/contention resolution timer, or any timer for HARQ acknowledgement reception, or any timer for downlink or uplink grant reception. Additionally, starting at time T0, the UE 115 may monitor the channel for a network activity indication signal 202 from the BS 105 during the monitoring duration 204. The network activity indication signal 202 may be any type of serving cell transmission (e.g., synchronization signal transmission, COT indicator, preamble associated with a start of a TXOP, group-common PDCCH, wakeup signal, etc.) from the BS 105. A UE 115 that monitors for PDCCH may monitor for the network activity indication signal 202 and/or the DL control message and may depend on the context.

The BS 105 may transmit configuration information for switching of a DL control message monitoring duration. In an example, the configuration information may cause the UE 115 to switch from the monitoring duration 204 to the monitoring duration 206 for monitoring of the DL control message. The configuration information may include the network activity indication signal 202. The BS 105 may configure one or both of the monitoring durations 204 and 206. Additionally, the BS 105 may communicate a communication signal based on the configuration information. In an example, the communication signal includes the DL control message.

If the UE 115 detects the network activity indication signal 202, it may be likely that the BS 105 was able to acquire the channel for transmissions. The UE 115 may continue to monitor for the DL control message during the monitoring duration 204. If the UE 115 does not detect the network activity indication signal 202 before expiry of the monitoring duration 204, it is likely that the BS 105 was unable to acquire the channel. In this example, the UE 115 may assume that the PDCCH monitoring has failed and may execute those actions in response to the expiry of the monitoring duration 204, where the UE 115 does not detect the network activity indication signal 202 during the monitoring duration 204.

If the UE 115 detects the network activity indication signal 202 based on monitoring for the signal, it may be likely that performance of the LBT by the BS 105 resulted in an LBT pass and the BS 105 acquired the channel for transmission. The UE 115 may leverage its knowledge that the BS 105 was able to transmit the network activity indication signal 202 and may accordingly expect to receive the DL control message within a particular time period from detecting the network activity indication signal 202. Accordingly, it may be unnecessary for the UE 115 to continue to monitor for the DL control message for the entire monitoring duration 204.

In the example illustrated in FIG. 2, the UE 115 detects the network activity indication signal 202 before expiry of the monitoring duration 206. In this example, the UE 115 may switch from the monitoring duration 204 to the monitoring duration 206 for monitoring of the DL control message in response to detecting the network activity indication signal 202. The UE 115 may switch the timer length from the monitoring duration 204 to the monitoring duration 206 for monitoring of the DL control message.

The UE 115 may switch the timer length from the monitoring duration 204 to the monitoring 206 using various mechanisms. In an example, upon detecting the network activity indication signal 202, the UE 115 may reconfigure the timer based on a remaining duration to the monitoring duration 206 and perform PDCCH monitoring until the timer expires. In another example, at time T0, the UE 115 may configure a first timer with a duration of the monitoring duration 204 and a second timer with a duration of the monitoring duration 206. Upon detecting the network activity indication signal 202, the UE 115 may abort or stop the first timer and perform PDCCH monitoring until the second timer expires.

In some examples, the UE 115 may determine, based on a threshold 210, whether to switch from the monitoring duration 204 to the monitoring duration 206. The UE 115 may determine whether the network activity indication signal 202 is detected within a difference monitoring duration 208, which is the result of subtracting the threshold 210 from the monitoring duration 206. The threshold 210 may be a small interval (e.g., order of slots). If the UE 115 detects the network activity indication signal 202 within the difference monitoring duration 208 (as shown in FIG. 2), the UE 115 may switch from the monitoring duration 204 to the monitoring duration 206 for monitoring of the DL control message. If the UE 115 detects the network activity indication signal 202 after the difference monitoring duration 208 has elapsed, the UE 115 may continue to monitor for the DL control message based on the monitoring duration 204. The BS 105 may configure the UE 115 with the threshold 210 via an RRC configuration.

To facilitate synchronization in a radio access network, the BS 105 may transmit discovery reference signals (DRS) in a designated time period. The designated time period may be referred to as a measurement window. In NR, the designated time period may be referred to as a DRS measurement timing configuration (DMTC) window. The BS 105 may configure the DMTC window, and the measurement windows may be repeated at a predetermined periodicity. In some examples, the BS 105 transmits synchronization signals to allow UEs to search and acquire synchronization to a cell within the radio access network. If the DMTC windows are scheduled during the PDCCH monitoring duration, the network may prioritize the synchronization signal transmissions as opposed to the PDCCH transmissions that are meant for the UE 115. In this example, although the network transmits synchronization signals in the channel to multiple UEs, which may include the UE 115, it may be possible that the network does not have PDCCH scheduled for the UE 115. Accordingly, the UE 115 may ignore the network activity indication signal 202 if the signal is received within the DMTC window. In an example, if the UE 115 detects the network activity indication signal 202 during the DMTC window, the UE 115 may ignore the network activity indication signal 202 and does not switch from the monitoring duration 204 to the monitoring duration 206 for monitoring of the DL control message.

FIG. 3 illustrates a communication scheme 300 for monitoring for a DL control message according to some embodiments of the present disclosure. The communication scheme 300 may correspond to a communication scheme between a BS 105 and a UE 115 of the network 100. In FIG. 3, the x-axis represents time in some constant units. In FIG. 3, the UE 115 may use the monitoring duration 204 and the monitoring duration 206 to monitor for one or more DL control messages. In an example, the monitoring duration 204 may be the default PDCCH monitoring duration.

At time T0, the UE 115 triggers the PDCCH monitoring, and the UE 115 monitors a channel for a DL control message and for the network activity indication signal 202 during the monitoring duration 204. At time T1, the UE 115 detects the network activity indication signal 202. The time T1 occurs after the monitoring duration 206 has elapsed. If the UE 115 detects the network activity indication signal 202 near an end of the monitoring duration 206 or after the monitoring duration 206 has elapsed, rather than switch the timer to the monitoring duration 206 (which is almost over or is over), the UE 115 may add a grace period to the PDCCH monitoring time. A margin time 302 may act as the grace period for the UE 115 to continue monitoring for the DL control message until the margin time 302 has elapsed. Accordingly, if the UE 115 detects the network activity indication signal 202 near an end of the monitoring duration 206 or after the monitoring duration 206 has elapsed, but before the monitoring duration 204 has elapsed, the UE 115 may add the margin time 302 to the PDCCH monitoring duration starting from the time instant (e.g., time T1) when the UE 115 detects the network activity indication signal 202. The UE 115 may continue to monitor for the DL control message during the PDCCH monitoring duration until the margin time 302 elapses. The UE 115 may stop the timer for the PDCCH monitoring in response to the end of the margin time 302.

From the time T0 to time T1 to an end of the margin time 302, the UE 115 may continue to monitor for the DL control message. The margin time 302 may be long enough to provide the BS 105 with sufficient time to transmit the DL control message to the UE 115, and the UE 115 may assume that the BS 105 will not schedule transmission of the DL control message subsequent to the margin time 302. Accordingly, the UE 115 may prematurely stop monitoring for the DL control message after the margin time 302 elapses. By reducing its PDCCH monitoring duration from the monitoring duration 204 to an end of the margin time 302, the UE 115 may lower its power consumption. Additionally, delay in the procedures (e.g., RACH) may be reduced because the UE 115 may be able to transmit the RACH preamble earlier than before.

If the UE 115 does not detect the DL control message from the BS 105 during the margin time 302, the UE 115 may assume the timer for the PDCCH monitoring has expired. In this example, it may be likely that no DL control messages were scheduled for transmission to the UE 115 or that the UE 115 failed to detect the DL control message that was sent.

In an example, the margin time 302 may be RRC-configured. In another example, the margin time 302 may be based on the type of network activity indication signal 202 that was detected by the UE 115. For example, the network activity indication signal 202 may be a COT indicator or Slot Format Indicator (SFI) that is transmitted by the BS 105 using a group-common PDCCH. The COT indicator or SFI may indicate a duration of time remaining in a TXOP acquired by the BS 105. The COT indicator or SFI may indicate the margin time 302, which may be the same as the duration of time remaining in the BS-acquired TXOP. For example, if the COT indicator indicates that the BS 105 has eight ms left in the current BS-acquired TXOP, the UE 115 may set the margin time 302 to eight ms and continue to monitor for the DL control message for the next eight ms.

The PDCCH monitoring time may have a maximum duration equal to the following formula: max (time T1+margin time 302, monitoring duration 206), where time T1 represents the time instance when the UE 115 detects the network activity indication signal 202. In an example, the monitoring duration 206 is zero.

In the examples illustrated in FIGS. 2 and 3, starting at the time T0, the UE 115 may continuously monitor for PDCCH during the time a given timer is running. If an interfering node acquires the unlicensed channel for transmission, it may be expected that the channel will remain busy for a time duration (e.g., order of ms). In such cases, rather than monitor for PDCCH during a long, continuous time window, the UE 115 may perform discontinuous PDCCH monitoring. In an example, the UE 115 may perform PDCCH monitoring over short time occasions distributed over an elongated window, to allow more LBT opportunities for the network. The UE 115 may break the entire time window into a plurality of smaller time windows for PDCCH monitoring. Each time window for PDCCH monitoring may be referred to as a PDCCH monitoring occasion. In an example, the UE 115 does not monitor for PDCCH outside of PDCCH monitoring occasions. By monitoring PDCCH in intervals, the UE 115 may reduce power consumption while maximizing opportunities for the network to acquire the channel.

Figure 4:
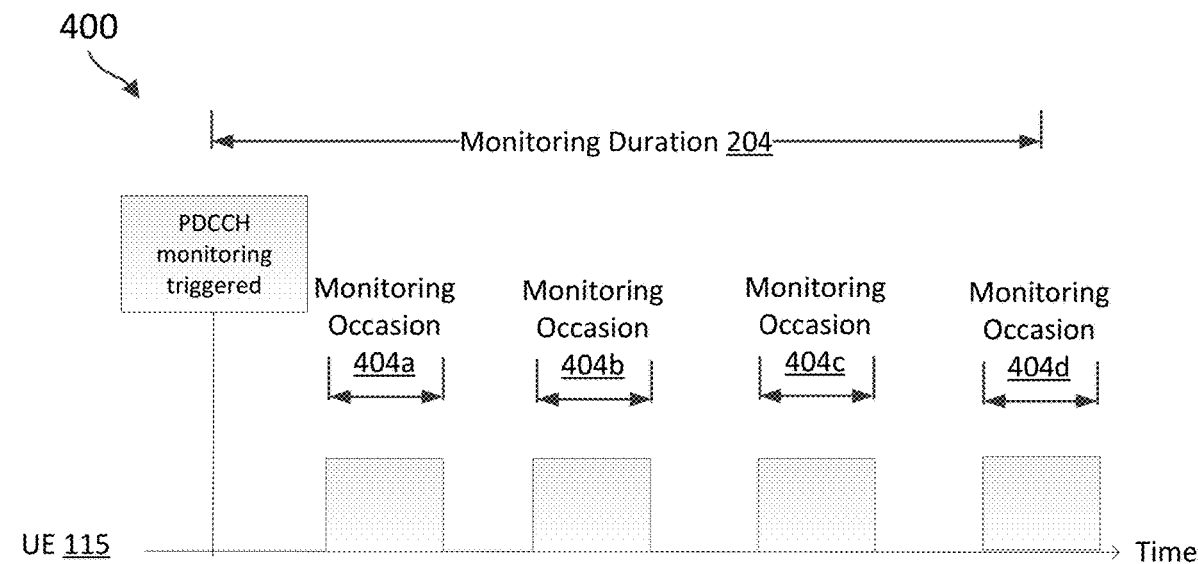
FIG. 4 illustrates a communication scheme for DL control message monitoring using a plurality of Physical DL Control Channel (PDCCH) monitoring occasions according to some embodiments of the present disclosure.
Figure 5:
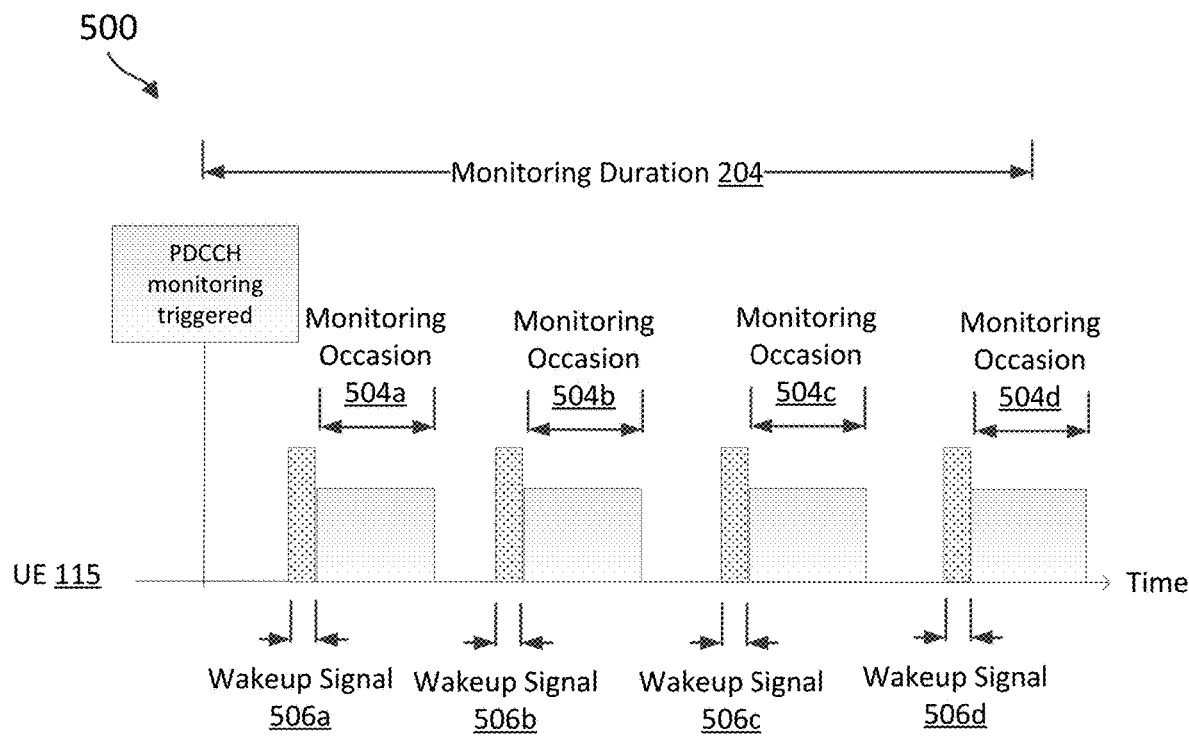
FIG. 5 illustrates a communication scheme for DL control message monitoring using a plurality of PDCCH monitoring occasions according to some embodiments of the present disclosure.
Figure 6:
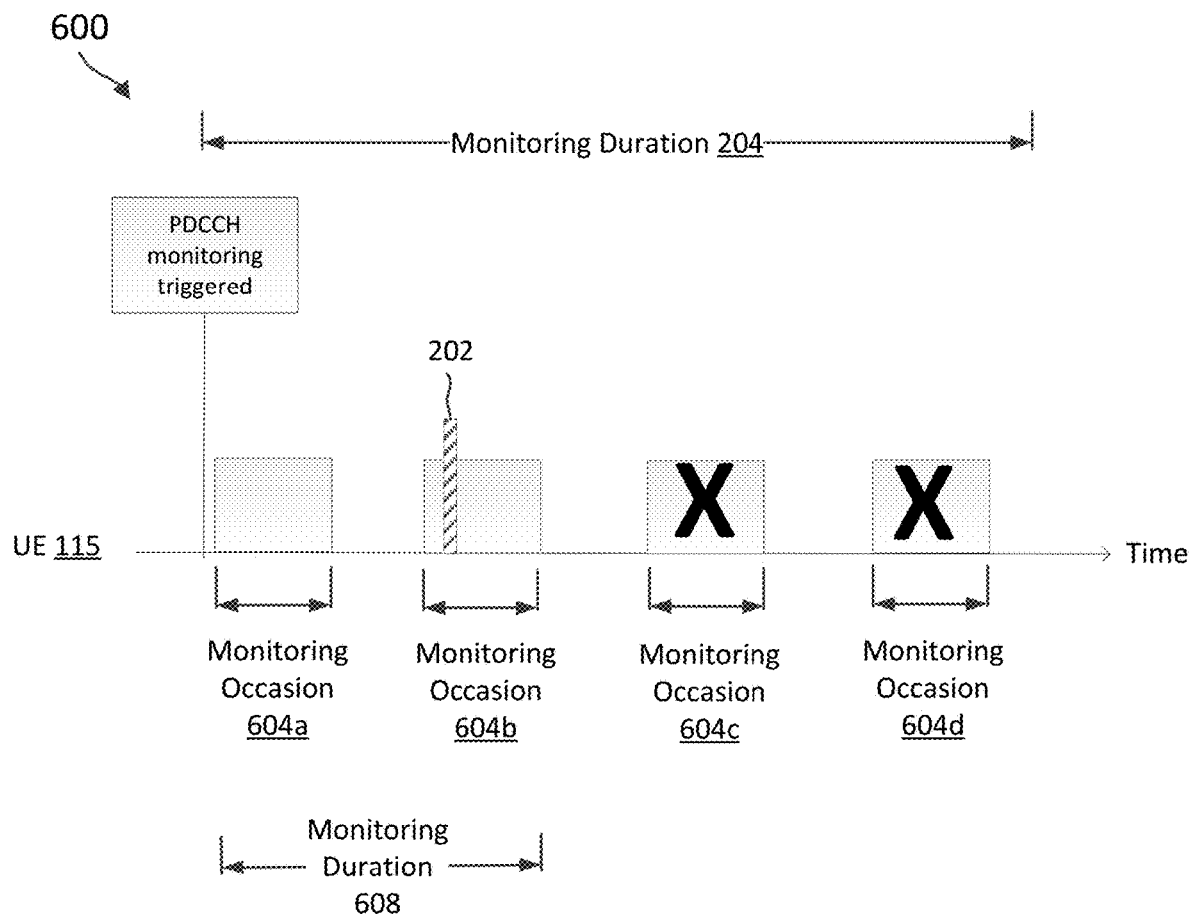
FIG. 6 illustrates a communication scheme for DL control message monitoring using a plurality of PDCCH monitoring occasions according to some embodiments of the present disclosure.

In FIGS. 4-6, the UE 115 performs discontinuous PDCCH monitoring. FIG. 4 illustrates a communication scheme 400 for monitoring for a DL control message using a plurality of PDCCH monitoring occasions according to some embodiments of the present disclosure. The communication scheme 400 may correspond to a communication scheme between a BS 105 and a UE 115 of the network 100. In FIG. 4, the x-axis represents time in some constant units. In FIG. 4, rather than continuously monitor for PDCCH throughout the monitoring duration 204, the UE 115 may monitor for PDCCH during the monitoring occasions 404a, 404b, 404c, and 404d and return to a sleep mode between the monitoring occasions 404a, 404b, 404c, and 404d. The UE 115 does not monitor for PDCCH while in the sleep mode. In some examples, the UE 115 partitions the monitoring duration 204 into the plurality of monitoring occasions 404a, 404b, 404c, and 404d.

The BS 105 may transmit configuration information for switching of a continuous monitoring duration for a DL control message to a plurality of PDCCH monitoring occasions. Additionally, the BS 105 may configure the duration of each PDCCH monitoring occasion 404a, 404b, 404c, and 404d and/or the number of PDCCH monitoring occasions for each instance of a timer (e.g., DRX timer, paging window, or RAR/content resolution window). In an example, the BS 105 configures the UE 115 to perform PDCCH monitoring for about 4 ms on four monitoring occasions, during a monitoring duration 204 that is about 20 ms. The PDCCH monitoring occasions 404a, 404b, 404c, and 404d may have the same time duration (e.g., about 4 ms) or at least two PDCCH monitoring occasions may have different time durations from each other. In the latter example, the BS 105 may configure the UE 115 to increase the duration of each subsequent PDCCH monitoring occasion, within the monitoring duration 204.

The UE 115 performs PDCCH monitoring for a periodical number of PDCCH monitoring occasions. The UE 115 may break up the monitoring duration 204 into a plurality of PDCCH monitoring occasions and perform such periodical PDCCH monitoring for each instance of the timer. In an example, the PDCCH monitoring occasion 404a occurs in slot 0 of a TXOP, the PDCCH monitoring occasion 404b occurs in slot 10of the TXOP, the PDCCH monitoring occasion 404c occurs in slot 20 of the TXOP, etc. The BS 105 may communicate a communication signal (e.g., the DL control message) based on the configuration information.

FIG. 5 illustrates a communication scheme 500 for monitoring for a DL control message using a plurality of PDCCH monitoring occasions according to some embodiments of the present disclosure. The communication scheme 500 may correspond to a communication scheme between a BS 105 and a UE 115 of the network 100. In FIG. 5, the x-axis represents time in some constant units. In FIG. 5, each PDCCH monitoring occasion 504a, 504b, 504c, and 504d starts in response to the UE 115 detecting a wakeup signal 506a, 506b, 506c, and 506d, respectively. The BS 105 may configure the duration for the wakeup signal monitoring, when the PDCCH monitoring is triggered, the duration of each PDCCH monitoring occasion (e.g., about 4 ms), and/or the number of PDCCH monitoring occasions within the monitoring duration 204.

The UE 115 may monitor for a wakeup signal from the BS 105. A wakeup signal may be, for example, a DeModulation Reference Signal (DM-RS) or a predefined preamble or an SSB. The decoding of a wakeup signal may be less complex compared to the decoding for a PDCCH transmission. In response to detecting the wakeup signal, the UE 115 triggers a PDCCH monitoring occasion. When the PDCCH monitoring occasion finishes, the UE 115 may return to a sleep mode and monitor for the next wakeup signal.

FIG. 6 illustrates a communication scheme 600 for monitoring for a DL control message using a plurality of PDCCH monitoring occasions according to some embodiments of the present disclosure. The communication scheme 600 may correspond to a communication scheme between a BS 105 and a UE 115 of the network 100. In FIG. 6, the x-axis represents time in some constant units. In FIG. 6, the BS 105 may transmit configuration information for switching of a downlink control message monitoring duration. The BS 105 may configure the UE 115 to monitor for the network activity indication signal 202 during the PDCCH monitoring occasions 604a, 604b, 604c, and 604d, within the monitoring duration 204. The network activity indication signal 202 may be a COT indicator or any other DL control signal (e.g., PDCCH or SSB).

In an example, if the UE 115 detects the network activity indication signal 202 at a Kth PDCCH monitoring occasion, then the UE 115 may assume that the PDCCH monitoring timer expires after the Kth PDCCH monitoring occasion. In FIG. 6, the UE 115 detects the network activity indication signal 202 during the PDCCH monitoring occasion 604b. If the UE 115 detects the network activity indication signal 202, the UE 115 may assume that the BS 105 was able to acquire the channel and should send any DL control messages (e.g., PDCCH) intended for the UE 115. The time remaining from the time instance that the UE 115 detects the network activity indication signal 202 to the end of the PDCCH monitoring occasion 604b during which the network activity indication signal 202 was detected may be considered enough time for the BS 105 to send any DL control messages intended for the UE 115. Accordingly, it may be unnecessary for the UE 115 to perform PDCCH monitoring for the entirety of the monitoring duration 204, and the UE 115 may terminate the PDCCH monitoring at the end of the monitor 604b. The UE 115 continues to perform PDCCH monitoring during the monitoring occasion 604b, but assumes that the timer expires at the end of the monitoring occasion 604b. The UE 115 does not perform further PDCCH monitoring after the monitoring occasion 604b within the monitoring duration 204, and accordingly does not perform PDCCH monitoring during the monitoring occasions 604c and 604d as indicated by the marked "X" in FIG. 6. In some examples, after the UE 115 has performed a specified number of PDCCH monitoring occasions within the monitoring duration 204, the UE 115 may assume that the timer has expired.

In an example, the UE 115 switches from the monitoring duration 204 to a monitoring duration 608 for monitoring of the DL control message in response to detecting the network activity indication signal 202 during the monitoring occasion 604b. The monitoring duration 608 spans a duration from the start of the monitoring occasion 604a to the end of the monitoring occasion 604b.

As discussed above, if the UE 115 detects the network activity indication signal 202 during a DMTC window, the transmission of the synchronization signals during the DMTC may be prioritized over other signals (e.g., PDCCH). Additionally, transmission of synchronization signals does not imply that the BS 105 will transmit PDCCH to the UE 115. Accordingly, the UE 115 may ignore any network activity indication signal 202 that is detected within a DMTC window. In this example, the UE 115 does not terminate the PDCCH monitoring early if the network activity indication signal 202 is detected within a DMTC window.

In some examples, the BS 105 configures a random access timer based on a TXOP acquired by the BS 105. Rather than perform PDCCH monitoring over the entire monitoring duration 204, the UE 115 may shorten the duration based on whether the UE 115 has performed a RACH transmission. During initial network access, the UE 115 and the BS 105 may perform a random access procedure before entering a normal operation stage, where operational data may be exchanged. In some examples, the UE and the BS perform a four-step random access procedure. In the four-step random access procedure, the UE transmits a first random access message (MSG 1) carrying a random access preamble according to the RACH configuration. After sending the MSG 1, the UE monitors for a second random access message (MSG 2) from the BS within a RAR window (e.g., configuring a timer with a duration corresponding to the RAR window. For each detected random access preamble, the BS transmits a MSG 2 according to the random access message transmission configuration. The MSG 2, which is the RAR, is a response to the random access preamble received from the UE and carries an UL grant that may be used by the UE to transmit content to the BS. Upon detecting the MSG 2, the UE processes the MSG 2 and responds to the RAR received from the BS by transmitting a third random access message (MSG 3) according to the random access message transmission configuration. The MSG 3 carries a connection request to the BS. After transmitting the MSG 3, the UE may configure a timer with a duration corresponding to a contention resolution window and monitor for a connection response from the BS. The BS receives the MSG 3 and acknowledges its receipt by sending a fourth random access message (e.g., MSG 4), which carries a connection response, to the UE 115. In an example, the UE 115 may configure a shortened PDCCH monitoring duration based on whether the UE 115 has transmitted MSG 1 or MSG 3 during a TXOP acquired by the BS 105. Such shortening of the PDCCH monitoring duration may reduce the delay in performing the random access procedure.

Figure 7:
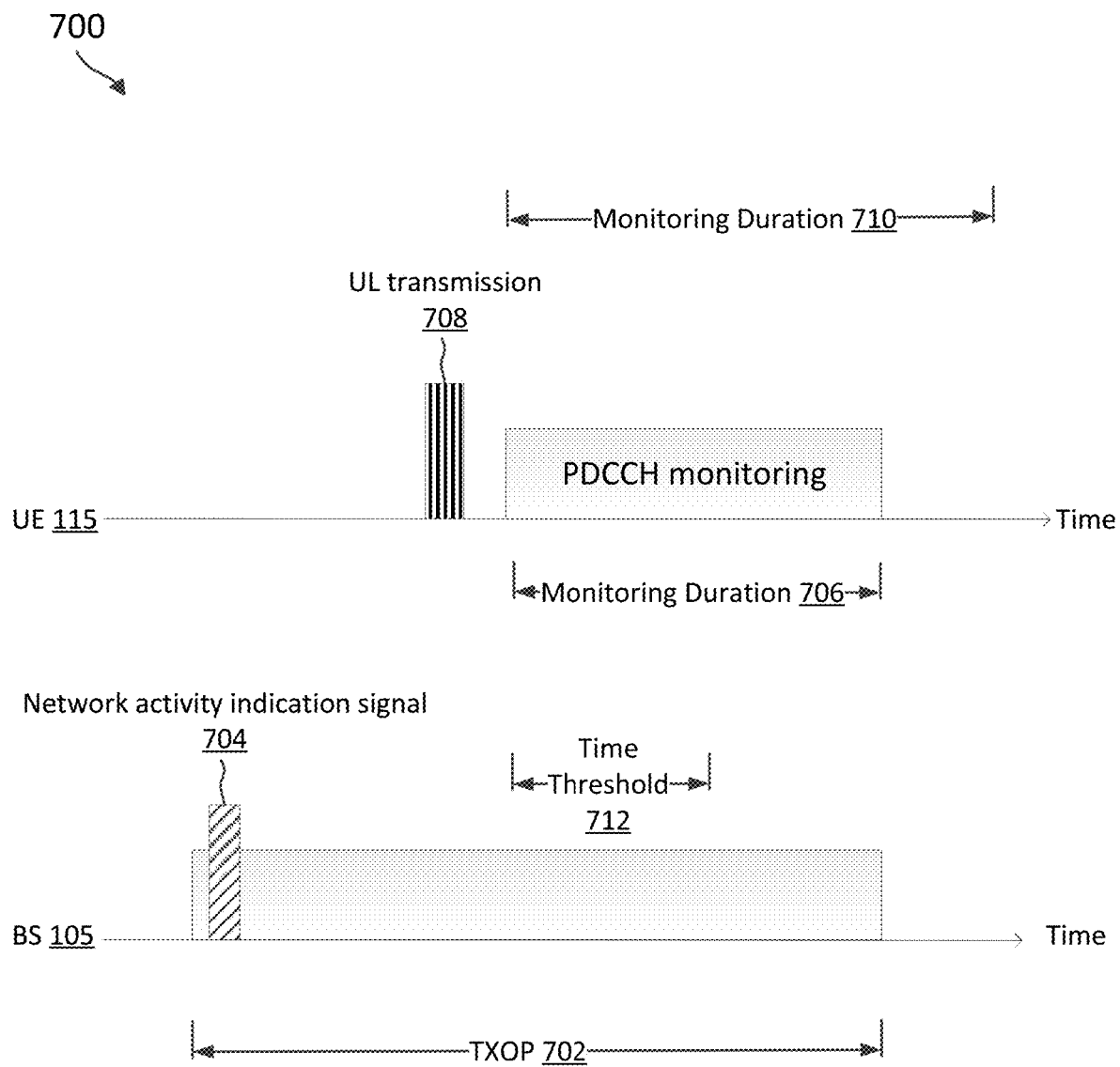
FIG. 7 illustrates a communication scheme for DL control message monitoring based on a transmission opportunity (TXOP) acquired by the network according to some embodiments of the present disclosure.
Figure 8:
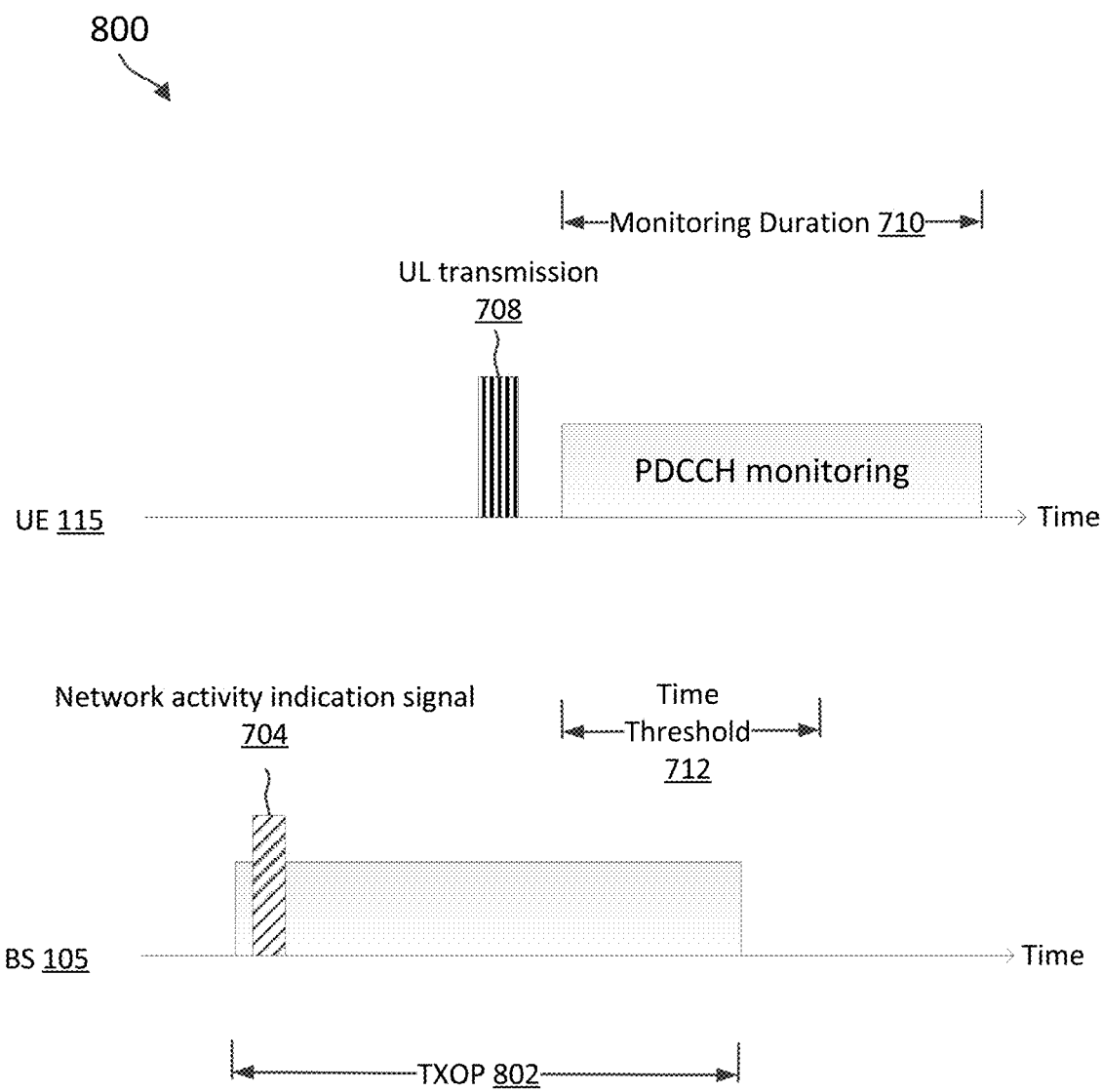
FIG. 8 illustrates a communication scheme for DL control message monitoring based on a TXOP acquired by the network according to some embodiments of the present disclosure.

In FIGS. 7 and 8, the UE 115 performs PDCCH monitoring based on a TXOP acquired by the network. It may be a waste of processing cycles for the UE 115 to continue to monitor for PDCCH after expiration of the TXOP acquired by the BS 105. FIG. 7 illustrates a communication scheme 700 for monitoring for a DL control message based on a TXOP acquired by the network according to some embodiments of the present disclosure. The communication scheme 700 may correspond to a communication scheme between a BS 105 and a UE 115 of the network 100. In FIG. 7, the x-axis represents time in some constant units. In FIG. 7, the BS 105 performs LBT and the LBT results in an LBT pass. Based on the LBT pass, the BS 105 acquires a TXOP 702. The UE 115 may be configured to monitor for a DL control message from the BS 105 during a monitoring duration 710.

During the TXOP 702, the BS 105 may transmit configuration information for switching of a DL control message monitoring duration to the UE 115. In an example, the configuration information includes the network activity indication signal 704 specifying a monitoring duration 706 during which the UE 115 performs PDCCH monitoring after transmission of an UL transmission 708. In an example, the network activity indication signal 704 may be a RAR, which indicates a contention resolution timer for the monitoring duration 706. The monitoring duration 706 may be based on the RACH transmission type. For example, the network activity indication signal 704 may be a RAR indicating the monitoring duration 706 for the UE 115 to perform PDCCH monitoring after transmission of the UL transmission 708. The UE 115 may receive the RAR, and in response may transmit the UL transmission 708, which may be a MSG 3 of a random access procedure. In another example, the network activity indication signal 704 may be an uplink grant, which indicates a PDCCH monitoring timer for the monitoring duration 706. For example, the network activity indication signal 704 may be an uplink grant indicating the monitoring duration 706 for the UE 115 to perform HARQ acknowledgement or retransmission grant after transmission of the UL transmission 708. The UE 115 may receive the UL grant, and in response may transmit the UL transmission 708.

Based on receiving the RAR, the UE 115 may assume that the BS 105 was able to acquire the channel and should send any DL control messages (e.g., PDCCH) intended for the UE 115. Accordingly, the UE 115 may shorten the length of the PDCCH monitoring from the monitoring duration 710 to the monitoring duration 706 indicated by the RAR. In this example, the UE 115 may switch from the monitoring duration 710 to the monitoring duration 706 for monitoring of the DL control message in response to detecting the network activity indication signal 704. If the UL transmission 708 is the MSG 3, the UE 115 may monitor for the MSG 4 of the random access procedure from the BS 105 during the monitoring duration 706. The BS 105 may communicate a communication signal (e.g., the MSG 4) based on the configuration information for switching the monitoring duration for the DL control message. If monitoring for the DL control message is not triggered during the TXOP 702, the UE 115 may continue to monitor for the DL control message during the entire monitoring duration 710.

In some examples, the network activity indication signal 704 is transmitted via a group-common PDCCH that indicates a COT indicator. The COT indicator may indicate a length of the TXOP 702 (e.g., an end of the TXOP 702). In response to receiving the COT indicator 804, the UE 115 may transmit the UL transmission 708. In an example, the UE 115 may derive the monitoring duration 706 based on an amount of time remaining in the TXOP 702 after the UE 115 transmits the UL transmission 708. In another example, BS may configure the value of monitoring duration 706. The UE 115 transmits the UL transmission 708 within the TXOP 702 acquired by the BS 105 and may monitor for PDCCH until an end of the TXOP 702. In an example, the UL transmission 708 is a PRACH transmission (e.g., MSG 1) of a random access procedure, and the UE 115 monitors for the MSG 2 from the BS 105 during the monitoring duration 706. In response to receiving the MSG 1, the BS 105 may transmit the MSG 2 to the UE 115 during the TXOP 702. In another example, the UL transmission 708 is a MSG 3 of a random access procedure, and the UE 115 monitors for the MSG 4 from the BS 105 during the monitoring duration 706. In response to receiving the MSG 3, the BS 105 may transmit the MSG 4 to the UE 115 during the TXOP 702. In another example, the UL transmission 708 is any UL data transmission, and the UE 115 monitors for the HARQ acknowledgement or retransmission grant from the BS 105 during the monitoring duration 706. In response to receiving the UL data transmission, the BS 105 may transmit the HARQ acknowledgement or retransmission grant to the UE 115 during the TXOP 702.

In some examples, the PDCCH monitoring duration may depend on a time threshold 712. The BS 105 may transmit the configuration information, which may include the time threshold 712, for switching of the DL control message monitoring duration. The time threshold 712 may vary depending on various factors such as network traffic, priority class of the communication device, etc. In an example, the time threshold 712 may be two ms. After the PDCCH monitoring is triggered during the TXOP 702 acquired by the BS 105, the UE 115 may determine whether the amount of time remaining in the TXOP 702 after transmission of the UL 708 is greater than the time threshold 712. The UE 115 may reduce the monitoring duration 710 for PDCCH monitoring if the amount of time remaining in the TXOP 702 after the PDCCH monitoring is triggered is greater than the time threshold 712. In this example, the UE 115 may switch from the monitoring duration 710 to the monitoring duration 706 for monitoring the DL control message. Accordingly, the UE 115 may monitor for PDCCH during the monitoring duration 706 in response to a determination that the amount of time remaining in the TXOP 702 after the PDCCH monitoring is triggered is greater than the time threshold 712. The time threshold 712 may be the amount of time remaining in the TXOP 702.

The RRC configuration may include a maximum PDCCH monitoring duration (e.g., monitoring duration 710) and a minimum PDCCH monitoring time threshold (e.g., time threshold 712). In an example, the BS 105 configures the monitoring duration 706 and/or monitoring duration 710 based on the RRC configuration. The BS 105 may communicate a communication signal (e.g., the DL control message) based on the configuration information to the UE 115.

As shown in FIG. 8, the amount of time remaining in the TXOP 702 after the PDCCH monitoring is triggered is not greater than the time threshold 712. FIG. 8 illustrates a communication scheme 800 for monitoring for a DL control message based on a TXOP acquired by the network according to some embodiments of the present disclosure. The communication scheme 800 may correspond to a communication scheme between a BS 105 and a UE 115 of the network 100. In FIG. 8, the x-axis represents time in some constant units. In FIG. 8, the UE 115 may monitor the PDCCH for the monitoring duration 710 in response to a determination that the amount of time remaining in the TXOP 702 after the PDCCH monitoring is triggered is not greater than the time threshold 712. The BS 105 may not have sufficient opportunities to transmit PDCCH (e.g., MSG 2 or MSG 4) if the time remaining in the TXOP 702 after the PDCCH monitoring is triggered is not greater than the time threshold 712. The monitoring duration 710 is greater than the time threshold 712 and the time remaining in the TXOP 702 after the PDCCH monitoring is triggered, allowing for a larger PDCCH monitoring window when the BS 105 does not have sufficient transmission opportunities. The RRC configuration may include a maximum PDCCH monitoring duration (e.g., monitoring duration 710) and a minimum PDCCH monitoring time threshold (e.g., time threshold 712). In an example, the BS 105 configures the monitoring duration 710 and/or the time threshold 712 based on the RRC configuration.

Although the above descriptions related to FIGS. 7 and 8 discuss the duration for DL control message monitoring in relation to a network-acquired TXOP, it should be understood that the duration for DL control message monitoring may be based on a UE-acquired TXOP. Rather than performing PDCCH monitoring over an elongated time duration, the UE 115 may shorten the duration based on whether the network can use a UE-acquired TXOP for response messages. The PDCCH monitoring duration may be derived based on whether the UE-acquired TXOP for UL transmission (e.g., PRACH or MSG 3 transmission) can be shared by the network. Doing so may reduce random access procedure delays.

Figure 9:
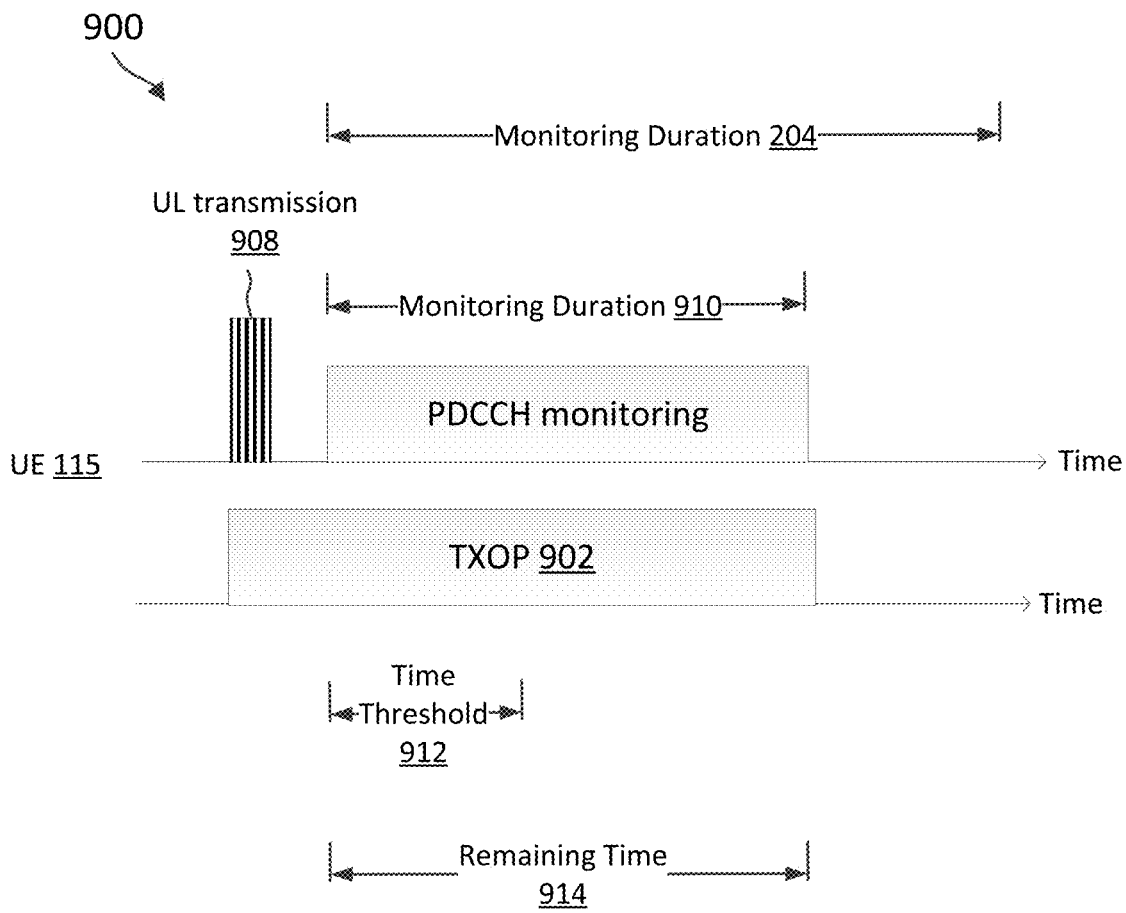
FIG. 9 illustrates a communication scheme for DL control message monitoring based on a user equipment (UE)-acquired TXOP according to some embodiments of the present disclosure.

FIG. 9 illustrates a communication scheme 900 for monitoring for a DL control message based on a UE-acquired TXOP according to some embodiments of the present disclosure. The communication scheme 900 may correspond to a communication scheme between a BS 105 and a UE 115 of the network 100. In FIG. 9, the x-axis represents time in some constant units. In FIG. 9, the UE 115 may be configured to perform PDCCH monitoring based on the monitoring duration 204. The UE 115 performs a category-4 LBT, and the category-4 LBT results in an LBT pass. Based on the LBT pass, the UE 115 acquires a TXOP 902 and transmits an UL transmission 908 during the TXOP 902. The category-4 LBT parameters are selected such that the BS 105 may maximize the duration of the TXOP 902 to transmit PDCCH.

The UE 115 determines whether a remaining time 914 is greater than a time threshold 912. The time threshold 912 may be a minimum amount of time that the BS 105 consumes for transmitting a DL control message to the UE 115. The remaining time 914 may indicate for how long the TXOP 902 is valid from the start of the PDCCH monitoring to the end of the TXOP 902. If the remaining time 914 is greater than the time threshold 912, the BS 105 may have sufficient opportunities and time for transmitting the DL control message to the UE 115. The UE 115 may switch from the monitoring duration 204 to a monitoring duration 910 for the monitoring of the DL control message in response to a determination that the remaining time 914 is greater than the time threshold 912. The remaining time 914 may be the same as the monitoring duration 910.

The UE 115 may transmit an indication to the BS 105 that the UE 115 has acquired the TXOP 902 and the monitoring duration 910 during which the UE 115 will monitor for PDCCH. The BS 105 may receive the indication from the UE 115 regarding the TXOP 902 and the monitoring duration 910, which indicates for how long the UE 115 will monitor for PDCCH. Based on receiving the indication, the BS 105 may attempt to transmit PDCCH during the monitoring duration 910. The UE 115 may monitor for PDCCH during the monitoring duration 910. After the monitoring duration 910 elapses, the UE 115 may assume that the timer has expired.

In an example, the UL transmission 908 is a PRACH transmission using category-4 LBT. In this example, the UE 115 may monitor for MSG 2 from the BS 105 during the monitoring duration 910. Additionally, the BS 105 may transmit the MSG 2 to the UE 115 during the monitoring duration 910. In another example, the UL transmission 908 is a MSG 3 transmission using category-4 LBT. In this example, the UE 115 may monitor for MSG 4 from the BS 105 during the monitoring duration 910. Additionally, the BS 105 may transmit the MSG 4 to the UE 115 during the monitoring duration 910. In another example, the UL transmission 908 is any UL data transmission using category-4 LBT. In this example, the UE 115 may monitor for HARQ acknowledgement or retransmission grant from the BS 105 during the monitoring duration 910. Additionally, the BS 105 may transmit the HARQ acknowledgement or retransmission grant to the UE 115 during the monitoring duration 910.

Figure 10:
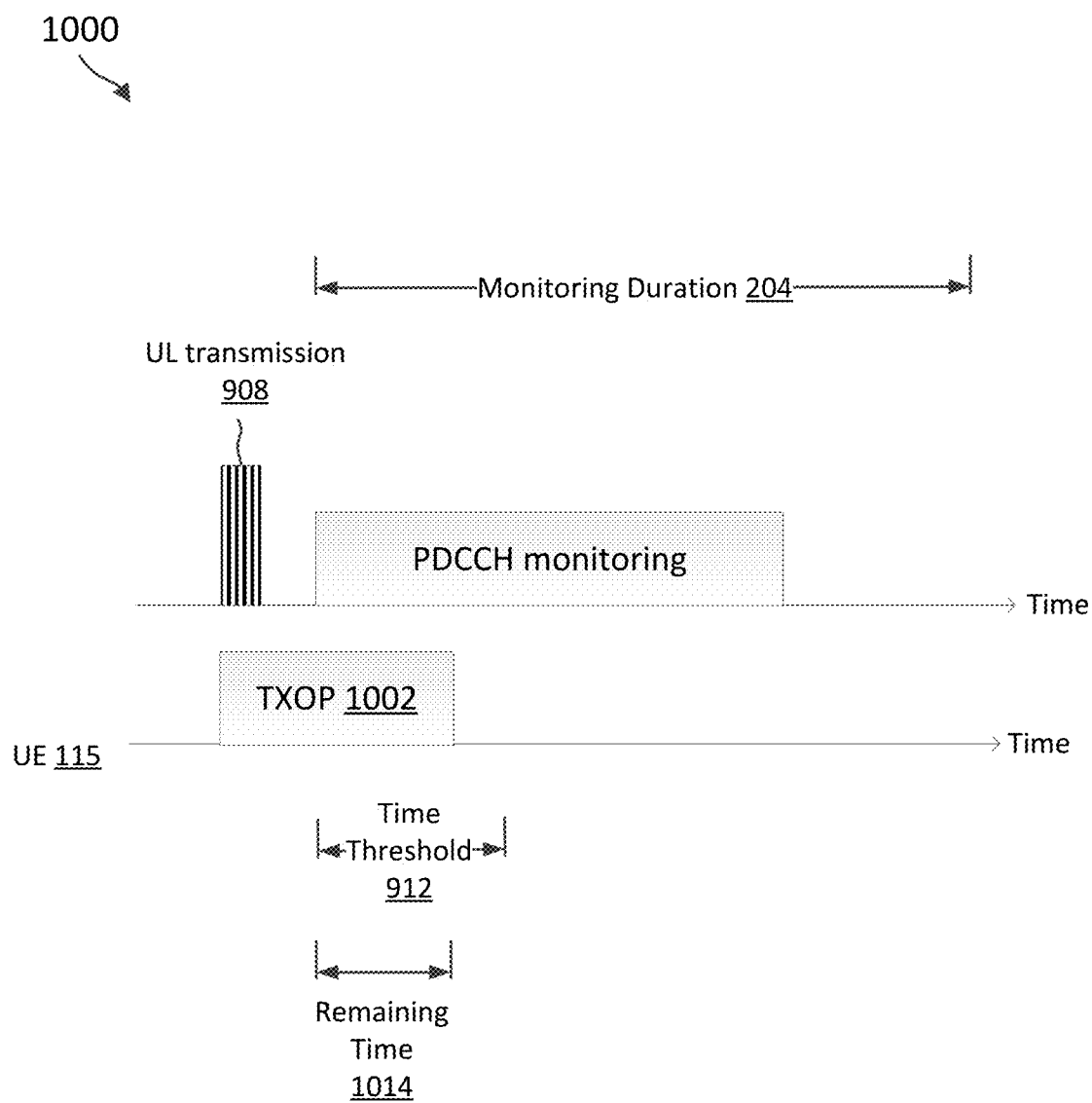
FIG. 10 illustrates a communication scheme for DL control message monitoring based on a TXOP acquired by the UE according to some embodiments of the present disclosure.

In the example illustrated in FIG. 9, the remaining time 914 is greater than the time threshold 912. As shown in FIG. 10, a remaining time 1012 is not greater than the time threshold 912. FIG. 10 illustrates a communication scheme 1000 for monitoring for a DL control message based on a TXOP acquired by the UE 115 according to some embodiments of the present disclosure. The communication scheme 1000 may correspond to a communication scheme between a BS 105 and a UE 115 of the network 100. In FIG. 10, the x-axis represents time in some constant units. In FIG. 10, the UE 115 may be configured to perform PDCCH monitoring based on the monitoring duration 204. The UE 115 performs a category-2 LBT or a category-4 LBT, and the category-2 or category-4 LBT, respectively, results in an LBT pass. Based on the LBT pass, the UE 115 acquires a TXOP 1002 and transmits the UL transmission 908 during the TXOP 1002.

The UE 115 determines whether a remaining time 1014 is greater than the time threshold 912. The remaining time 1014 may indicate for how long the TXOP 1002 is valid from the start of the PDCCH monitoring to the end of the TXOP 1002. If the remaining time 1014 is less than the time threshold 912, the BS 105 may have insufficient opportunities and/or time for transmitting the DL control message to the UE 115. For example, it may be difficult for the BS 105 to decode the UL transmission 908 (e.g., PRACH or MSG 3 transmission) and respond to the UE 115 before the remaining time 1014 elapses. The UE 115 may perform PDCCH monitoring based on the monitoring duration 204 for monitoring the DL control message in response to a determination that the remaining time 1014 is less than the time threshold 912. The monitoring duration 204 may be an RRC-configured value.

The UE 115 may transmit an indication to the BS 105 that the UE 115 has acquired the TXOP 1002 and the monitoring duration 204 during which the UE 115 will monitor for PDCCH. The BS 105 may receive the indication from the UE 115 and determine that the UE 115 will monitor for the DL control message during the monitoring duration 204. Based on receiving the indication, the BS 105 may attempt to transmit PDCCH during the monitoring duration 204. After the monitoring duration 204 elapses, the UE 115 may assume that the timer has expired.

In an example, the UL transmission 908 is a PRACH transmission using category-2 LBT. In this example, the UE 115 may monitor for MSG 2 from the BS 105 during the monitoring duration 204. Additionally, the BS 105 may transmit the MSG 2 to the UE 115 during the monitoring duration 204. In another example, the UL transmission 908 is a MSG 3 transmission using category-2 LBT. In this example, the UE 115 may monitor for MSG 4 from the BS 105 during the monitoring duration 204. Additionally, the BS 105 may transmit the MSG 4 to the UE 115 during the monitoring duration 204.

The PDCCH monitoring duration based on monitoring duration 204 in FIG. 10 is longer than the PDCCH monitoring duration based on the monitoring duration 910 in FIG. 9. In FIG. 10, the UE 115 determines to monitor for PDCCH for a longer period of time to allow the BS 105 sufficient time and opportunity to acquire the channel again.

Although some UL transmissions may have been described as being sent in response to an UL grant, it should be understood that the present disclosure applies to any UL transmission after which the UE 115 monitors for PDCCH after the UL transmission (e.g., autonomous UL transmissions).

Figure 11:
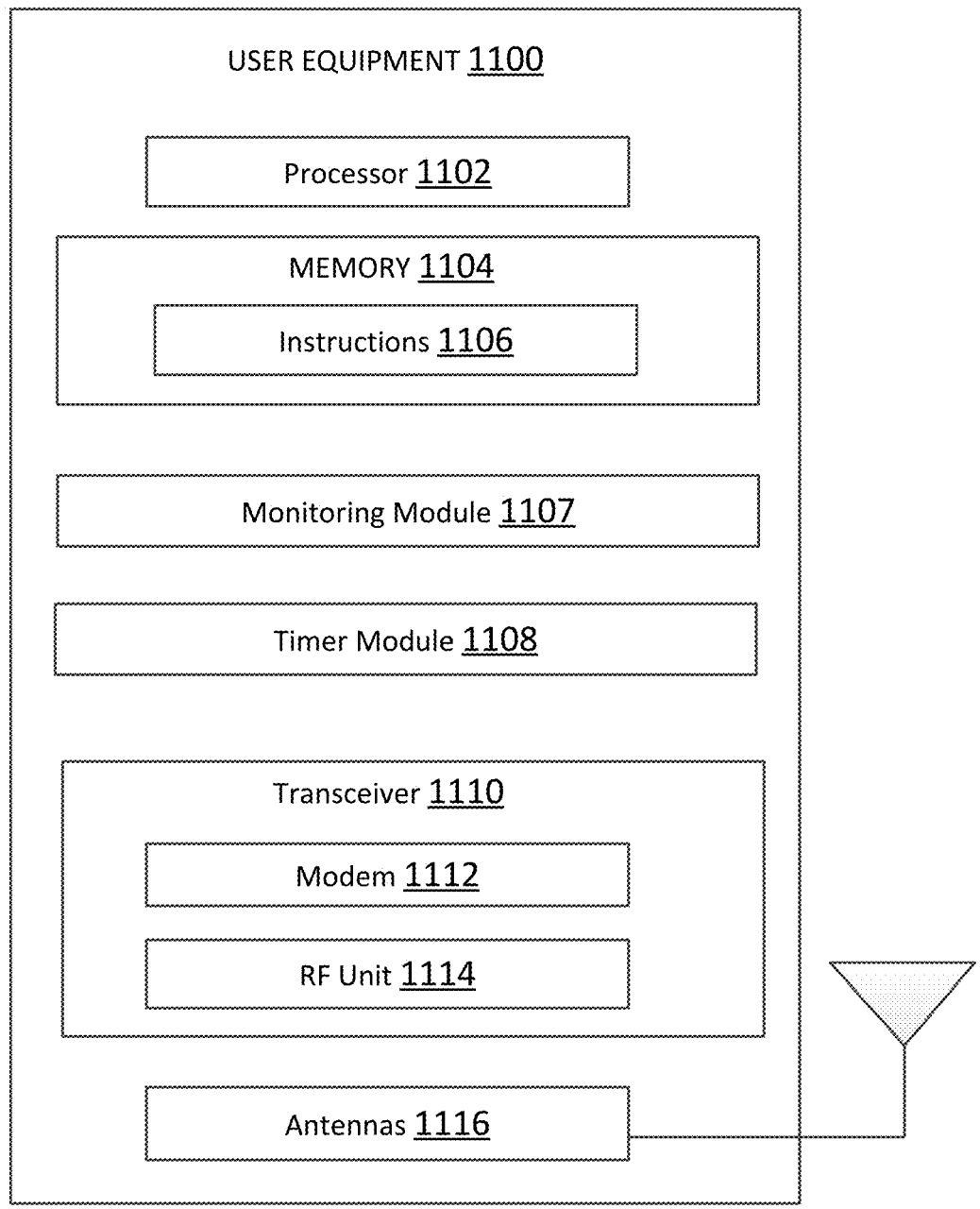
FIG. 11 is a block diagram of an example UE according to embodiments of the present disclosure.

FIG. 11 is a block diagram of an example UE 1100 according to embodiments of the present disclosure. The UE 1100 may be a UE 115 as discussed above. As shown, the UE 1100 may include a processor 1102, a memory 1104, a monitoring module 1107, a timer module 1108, a transceiver 1110 including a modem subsystem 1112 and a radio frequency (RF) unit 1114, and one or more antennas 1116. These elements may be in direct or indirect communication with each other, for example via one or more buses.

The processor 1102 may include a central processing unit (CPU), a digital signal processor (DSP), an application specific integrated circuit (ASIC), a controller, a field programmable gate array (FPGA) device, another hardware device, a firmware device, or any combination thereof configured to perform the operations described herein. The processor 1102 may also be implemented as a combination of computing devices, e.g., a combination of a DSP and a microprocessor, a plurality of microprocessors, one or more microprocessors in conjunction with a DSP core, or any other such configuration.

The memory 1104 may include a cache memory (e.g., a cache memory of the processor 1102), random access memory (RAM), magnetoresistive RAM (MRAM), read-only memory (ROM), programmable read-only memory (PROM), erasable programmable read only memory (EPROM), electrically erasable programmable read only memory (EEPROM), flash memory, solid state memory device, hard disk drives, other forms of volatile and non-volatile memory, or a combination of different types of memory. In an embodiment, the memory 1104 includes a non-transitory computer-readable medium. The memory 1104 may store instructions 1106. The instructions 1106 may include instructions that, when executed by the processor 1102, cause the processor 1102 to perform the operations described herein with reference to the UEs 115 in connection with embodiments of the present disclosure. The instructions 1106 may also be referred to as code. The terms "instructions" and "code" should be interpreted broadly to include any type of computer-readable statement(s). For example, the terms "instructions" and "code" may refer to one or more programs, routines, sub-routines, functions, procedures, etc. "Instructions" and "code" may include a single computer-readable statement or many computer-readable statements.

Each of the monitoring module 1107 and the timer module 1109 may be implemented via hardware, software, or combinations thereof. For example, each of the monitoring module 1107 and the timer module 1109 may be implemented as a processor, circuit, and/or instructions 1106 stored in the memory 1104 and executed by the processor 1102. Each of the monitoring module 1107 and the timer module 1108 may be used for various aspects of the present disclosure.

The monitoring module 1107 may be configured to monitor for a DL control message from a BS 105 during a first monitoring duration. Additionally, the monitoring module 1107 may be configured to monitor for a network activity indication signal from the BS during the first monitoring duration. The monitoring module 1107 may start to monitor for the DL control message and the network activity indication signal at the same time. In an example, the first monitor duration is an RRC-configured value.

The timer module 1108 may be configured to detect the network activity indication signal based on the monitoring of the network activity indication signal. Additionally, the timer module 1108 may be configured to switch from the first monitoring duration to a second monitoring duration for the monitoring of the DL control message in response to the detecting. The second monitoring duration may be shorter than the first monitoring duration.

As shown, the transceiver 1110 may include the modem subsystem 1112 and the RF unit 1114. The transceiver 1110 can be configured to communicate bi-directionally with other devices, such as the BSs 105 and/or another core network element. The modem subsystem 1112 may be configured to modulate and/or encode the data from the memory 1104, the monitoring module 1107, and/or the timer module 1108 according to a modulation and coding scheme (MCS), e.g., a low-density parity check (LDPC) coding scheme, a turbo coding scheme, a convolutional coding scheme, a digital beamforming scheme, etc. The RF unit 1114 may be configured to process (e.g., perform analog to digital conversion or digital to analog conversion, etc.) modulated/encoded data from the modem subsystem 1112 (on outbound transmissions) or of transmissions originating from another source such as a UE or a BS 105. The RF unit 1114 may be further configured to perform analog beamforming in conjunction with the digital beamforming. Although shown as integrated together in transceiver 1110, the modem subsystem 1112 and the RF unit 1114 may be separate devices that are coupled together at the UE 1100 to enable the UE 1100 to communicate with other devices.

The RF unit 1114 may provide the modulated and/or processed data, e.g. data packets (or, more generally, data messages that may contain one or more data packets and other information), to the antennas 1116 for transmission to one or more other devices. The antennas 1116 may further receive data messages transmitted from other devices. The antennas 1116 may provide the received data messages for processing and/or demodulation at the transceiver 1110. The antennas 1116 may include multiple antennas of similar or different designs in order to sustain multiple transmission links. The RF unit 1114 may configure the antennas 1116.

Figure 12:
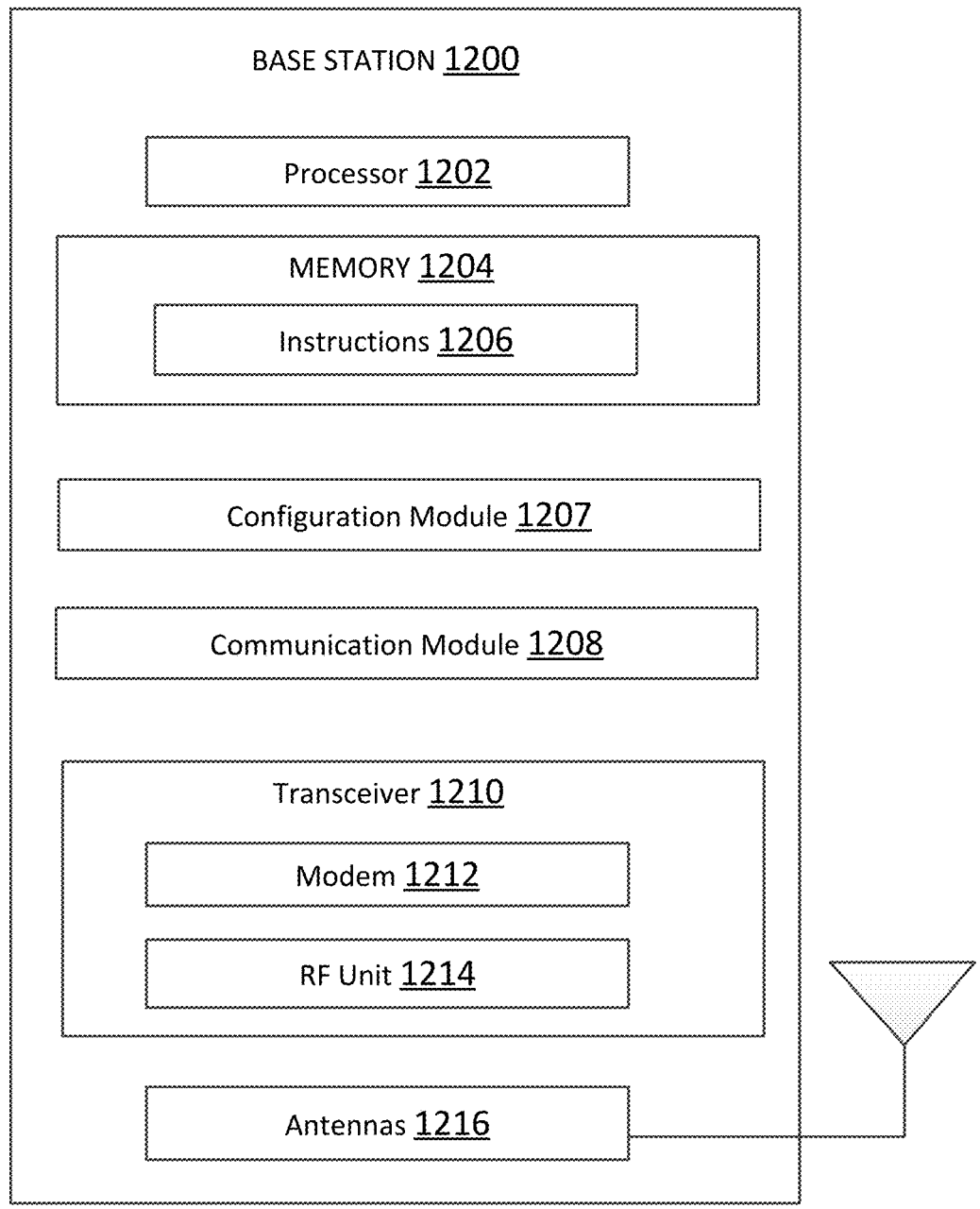
FIG. 12 is a block diagram of an example base station (BS) according to embodiments of the present disclosure.

FIG. 12 is a block diagram of an example BS 1200 according to embodiments of the present disclosure. The BS 1200 may be a BS 105 as discussed above. As shown, the BS 1200 may include a processor 1202, a memory 1204, a configuration module 1207, a communication module 1208, a transceiver 1210 including a modem subsystem 1212 and a RF unit 1214, and one or more antennas 1216. These elements may be in direct or indirect communication with each other, for example via one or more buses.

The processor 1202 may have various features as a specific-type processor. For example, these may include a CPU, a DSP, an ASIC, a controller, a FPGA device, another hardware device, a firmware device, or any combination thereof configured to perform the operations described herein. The processor 1202 may also be implemented as a combination of computing devices, e.g., a combination of a DSP and a microprocessor, a plurality of microprocessors, one or more microprocessors in conjunction with a DSP core, or any other such configuration.

The memory 1204 may include a cache memory (e.g., a cache memory of the processor 1202), RAM, MRAM, ROM, PROM, EPROM, EEPROM, flash memory, a solid state memory device, one or more hard disk drives, memristor-based arrays, other forms of volatile and non-volatile memory, or a combination of different types of memory. In some embodiments, the memory 1204 may include a non-transitory computer-readable medium. The memory 1204 may store instructions 1206. The instructions 1206 may include instructions that, when executed by the processor 1202, cause the processor 1202 to perform operations described herein. The instructions 1206 may also be referred to as code, which may be interpreted broadly to include any type of computer-readable statement(s) as discussed above with respect to FIG. 11.

Each of the configuration module 1207 and the communication module 1208 may be implemented via hardware, software, or combinations thereof. For example, each of the configuration module 1207 and the communication module 1208 may be implemented as a processor, circuit, and/or instructions 1206 stored in the memory 1204 and executed by the processor 1202. Each of the configuration module 1207 and the communication module 1208 may be used for various aspects of the present disclosure.

The configuration module 1207 may be configured to transmit to a wireless communication device (e.g., the UE 115), configuration information for switching of a DL control message monitoring duration signal. The communication module 1208 may be configured to communicate with the wireless communication device, a communication signal based on the configuration information.

As shown, the transceiver 1210 may include the modem subsystem 1212 and the RF unit 1214. The transceiver 1210 can be configured to communicate bi-directionally with other devices, such as the UEs 115 and/or another core network element. The modem subsystem 1212 may be configured to modulate and/or encode data according to a MCS, e.g., a LDPC coding scheme, a turbo coding scheme, a convolutional coding scheme, a digital beamforming scheme, etc. The RF unit 1214 may be configured to process (e.g., perform analog to digital conversion or digital to analog conversion, etc.) modulated/encoded data from the modem subsystem 1212 (on outbound transmissions) or of transmissions originating from another source such as a UE 115 or another BS. The RF unit 1214 may be further configured to perform analog beamforming in conjunction with the digital beamforming. Although shown as integrated together in transceiver 1210, the modem subsystem 1212 and/or the RF unit 1214 may be separate devices that are coupled together at the BS 1200 to enable the BS 1200 to communicate with other devices.

The RF unit 1214 may provide the modulated and/or processed data, e.g. data packets (or, more generally, data messages that may contain one or more data packets and other information), to the antennas 1216 for transmission to one or more other devices. This may include, for example, transmission of information to complete attachment to a network and communication with a camped UE 115 or 1100 according to embodiments of the present disclosure. The antennas 1216 may further receive data messages transmitted from other devices and provide the received data messages for processing and/or demodulation at the transceiver 1210. The antennas 1216 may include multiple antennas of similar or different designs in order to sustain multiple transmission links.

Figure 13:
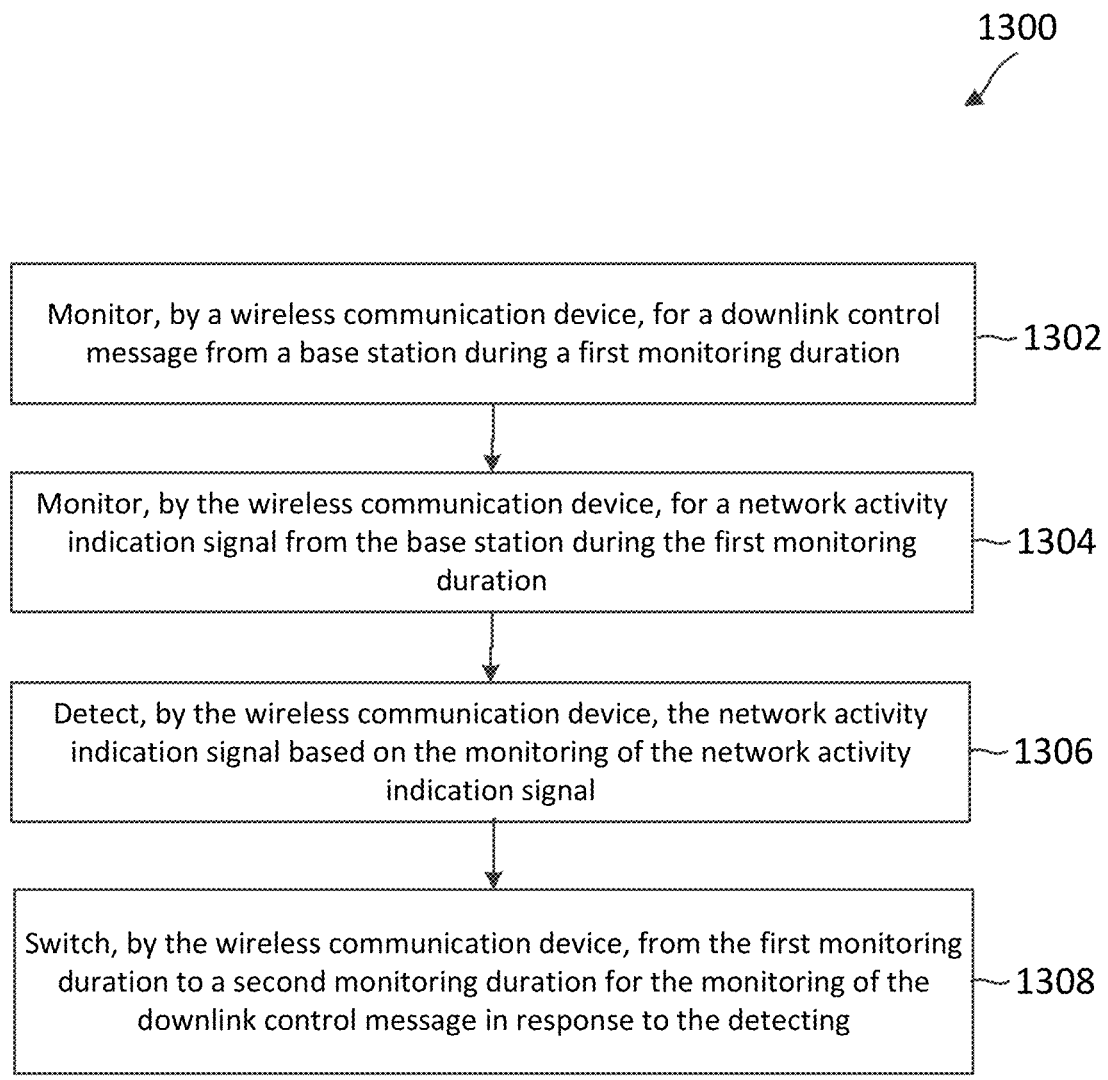
FIG. 13 is a flow diagram of a method for DL control message monitoring according to some embodiments of the present disclosure.

FIG. 13 is a flow diagram of a method 1300 for monitoring for a DL control message according to some embodiments of the present disclosure. Steps of the method 1300 can be executed by a computing device (e.g., a processor, processing circuit, and/or other suitable component) of a wireless communication device or other suitable means for performing the steps. For example, a wireless communication device, such as the UE 115 or UE 1100, may utilize one or more components, such as the processor 1102, the memory 1104, the monitoring module 1107, the timer module 1108, the transceiver 1110, the modem 1112, and/or the one or more antennas 1116, to execute the steps of method 1300. The method 1300 may employ similar mechanisms as in the communication schemes 200, 300, 400, 500, 600, 700, 800, 900, and/or 1000 as described with respect to FIGS. 2, 3, 4, 5, 6, 7, 8, 9, and/or 10, respectively. As illustrated, the method 1300 includes a number of enumerated steps, but embodiments of the method 1300 may include additional steps before, after, and in between the enumerated steps. In some embodiments, one or more of the enumerated steps may be omitted or performed in a different order.

At step 1302, the method 1300 includes monitoring, by a wireless communication device, for a DL control message from a BS during a first monitoring duration. At step 1304, the method 1300 includes monitoring, by the wireless communication device, for a network activity indication signal from the BS during the first monitoring duration. At step 1306, the method 1300 includes detecting, by the wireless communication device, the network activity indication signal based on the monitoring of the network activity indication signal. At step 1308, the method 1300 includes switching, by the wireless communication device, from the first monitoring duration to a second monitoring duration for the monitoring of the downlink control message in response to the detecting.

Figure 14:
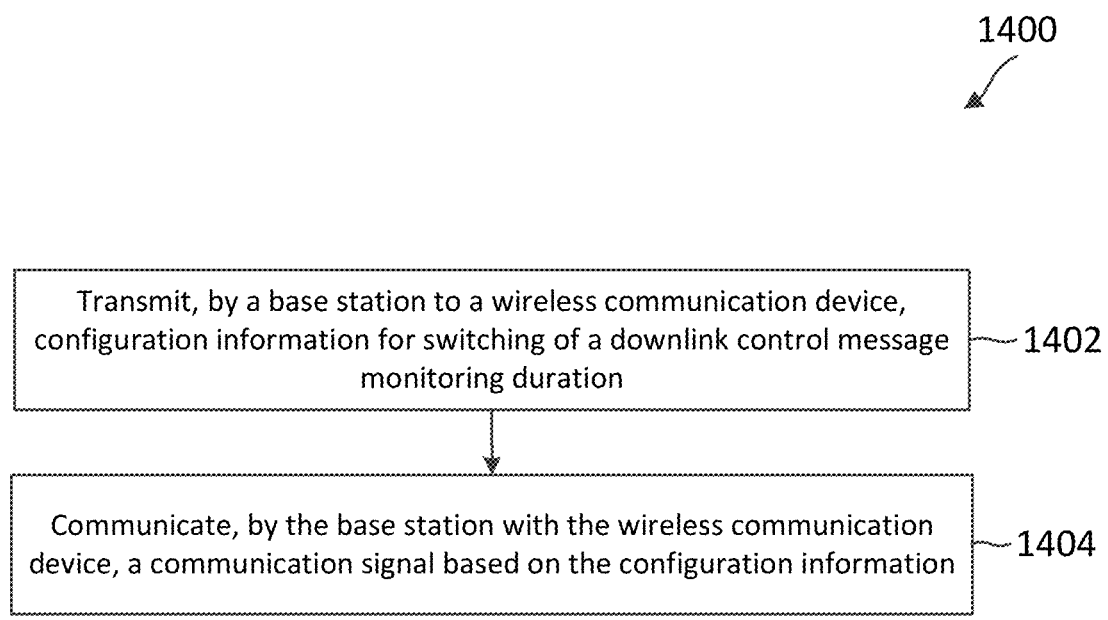
FIG. 14 is a flow diagram of a method for transmitting a DL control message based on configuration information according to some embodiments of the present disclosure.

FIG. 14 is a flow diagram of a method 1400 for transmitting a DL control message based on configuration information according to some embodiments of the present disclosure. Steps of the method 1400 can be executed by a computing device (e.g., a processor, processing circuit, and/or other suitable component) of a wireless communication device or other suitable means for performing the steps. For example, a wireless communication device, such as the BS 105 or BS 1200, may utilize one or more components, such as the processor 1202, the memory 1204, the configuration module 1207, the communication module 1208, the transceiver 1210, the modem 1212, and/or the one or more antennas 1216, to execute the steps of method 1400. The method 1400 may employ similar mechanisms as in the communication schemes 200, 300, 400, 500, 600, 700, 800, 900, and/or 1000 as described with respect to FIGS. 2, 3, 4, 5, 6, 7, 8, 9, and/or 10, respectively. As illustrated, the method 1400 includes a number of enumerated steps, but embodiments of the method 1400 may include additional steps before, after, and in between the enumerated steps. In some embodiments, one or more of the enumerated steps may be omitted or performed in a different order.

At step 1402, the method 1400 includes transmitting, by a BS to a wireless communication device, configuration information for switching of a DL control message monitoring duration. At step 1404, the method 1400 includes communicating, by the BS with the wireless communication device, a communication signal based on the configuration information.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items (for example, a list of items prefaced by a phrase such as "at least one of" or "one or more of") indicates an inclusive list such that, for example, a list of [at least one of A, B, or C] means A or B or C or AB or AC or BC or ABC (i.e., A and B and C).

As those of some skill in this art will by now appreciate and depending on the particular application at hand, many modifications, substitutions and variations can be made in and to the materials, apparatus, configurations and methods of use of the devices of the present disclosure without departing from the spirit and scope thereof. In light of this, the scope of the present disclosure should not be limited to that of the particular embodiments illustrated and described herein, as they are merely by way of some examples thereof, but rather, should be fully commensurate with that of the claims appended hereafter and their functional equivalents.

What is claimed is:

1. A method of wireless communication, comprising:
   monitoring, by a wireless communication device, for a downlink control message from a base station during a first configured monitoring duration;
   monitoring, by the wireless communication device, for a network activity indication signal from the base station during the first configured monitoring duration;
   detecting, by the wireless communication device, the network activity indication signal based on the monitoring of the network activity indication signal;
   switching, by the wireless communication device based on the detecting the network activity indication signal, from the first configured monitoring duration to a second configured monitoring duration for the monitoring of the downlink control message; and
   monitoring, by the wireless communication device in response to detecting the network activity indication signal at a first time between an expiration of the second configured monitoring duration and an expiration of the first configured monitoring duration, for the downlink control message from the base station during a margin time beginning at an end of the second configured monitoring duration.

2. The method of claim 1, wherein the first configured monitoring duration is longer than the second configured monitoring duration, and wherein detecting the network activity indication signal includes detecting the network activity indication signal at a first time after the second configured monitoring duration has elapsed.

3. The method of claim 2, further comprising:
   adding, by the wireless communication device, the margin time to the first time.

4. The method of claim 1, wherein monitoring the downlink control message includes monitoring one or more of a plurality of monitoring occasions, and wherein the wireless communication device does not monitor for the downlink control message outside of the plurality of monitoring occasions.

5. The method of claim 4, wherein the plurality of monitoring occasions includes a periodical number of PDCCH monitoring occasions, the method further comprising:
detecting, by the wireless communication device, a first wakeup signal, wherein monitoring a first monitoring occasion of the plurality of monitoring occasions includes monitoring the first monitoring occasion in response to detecting the first wakeup signal.

6. The method of claim 4, wherein detecting the network activity indication signal includes detecting the network activity indication signal during a first monitoring occasion of the plurality of monitoring occasions, the method further comprising:
terminating, by the wireless communication device, the monitoring of the remaining monitoring occasions after the first monitoring occasion in response to detecting the network activity indication signal during the first monitoring occasion.

7. The method of claim 1, wherein the network activity indication signal is a random access response (RAR) message indicating the second configured monitoring duration after an uplink transmission to the base station, and wherein the uplink transmission is a MSG 3 transmission of a random access procedure to the base station.

8. The method of claim 7, wherein detecting the network activity indication signal includes detecting the network activity indication signal during a transmission opportunity (TXOP) acquired by the base station, the method further comprising:
triggering, by the wireless communication device, Physical Downlink Control Channel (PDCCH) monitoring at a first time, wherein after switching from the first configured monitoring duration to the second configured monitoring duration, monitoring for the downlink control message includes monitoring for the second configured monitoring duration after the uplink transmission to the base station.

9. The method of claim 8, wherein the second configured monitoring duration is based on an amount of time remaining in the TXOP after the uplink transmission.

10. The method of claim 1, wherein the network activity indication signal is an uplink grant indicating the second configured monitoring duration after an uplink transmission to the base station.

11. The method of claim 1, further comprising:
performing, by the wireless communication device, a listen-before-talk (LBT) on a channel;
in response to an LBT pass based on the LBT, acquiring a TXOP; and
transmitting in the channel, an uplink transmission during the TXOP, wherein the second configured monitoring duration is based on an amount of time remaining in the TXOP after transmitting the uplink transmission to the base station.

12. The method of claim 11, further comprising:
determining, by the wireless communication device, whether the amount of time remaining in the TXOP after transmitting the uplink transmission is greater than a threshold.

13. The method of claim 12, further comprising:
determining, by the wireless communication device, that the amount of time remaining is greater than the threshold, wherein the second configured monitoring duration is the amount of time in response to a determination that the amount of time remaining is greater than the threshold.

14. The method of claim 1, wherein the network activity indication signal indicates a channel occupancy time (COT) indicator.

15. The method of claim 1, further comprising:
configuring, by the wireless communication device, a timer corresponding to the second configured monitoring duration for monitoring the downlink control message.

16. An apparatus comprising:
a processor configured to:
monitor for a downlink control message from a base station during a first configured monitoring duration;
monitor for a network activity indication signal from the base station during the first configured monitoring duration;
detect the network activity indication signal based on the monitoring of the network activity indication signal;
switch, based on detecting the network activity indication signal, from the first configured monitoring duration to a second configured monitoring duration for the monitoring of the downlink control message; and
monitor, in response to detecting the network activity indication signal at a first time between an expiration of the second configured monitoring duration and an expiration of the first configured monitoring duration, for the downlink control message from the base station during a margin time beginning at an end of the second configured monitoring duration.

17. The apparatus of claim 16, wherein the first configured monitoring duration is longer than the second configured monitoring duration.

18. The apparatus of claim 16, wherein the network activity indication signal is a COT indicator indicating the second configured monitoring duration.

19. The apparatus of claim 16, further comprising:
a transceiver configured to transmit an uplink transmission in response to the network activity indication signal, wherein the network activity indication signal indicates the second configured monitoring duration, and
wherein the processor configures a timer corresponding to the second configured monitoring duration for monitoring the downlink control message.

20. The apparatus of claim 19, wherein the network activity indication signal is a RAR message, the uplink transmission includes a MSG 3 transmission of a random access procedure, and the downlink control message is a MSG 4 of the random access procedure from the base station.

21. The apparatus of claim 19, wherein the network activity indication signal is a COT indicator indicating a remaining time of a TXOP acquired by the base station, wherein the second configured monitoring duration is based on the remaining time of the TXOP acquired by the base station.

22. The apparatus of claim 21, wherein the uplink transmission is a physical random channel (PRACH) message transmission of a random access procedure, and the downlink control message is a MSG 2 of the random access procedure from the base station.

23. The apparatus of claim 19, wherein the network activity indication signal is an uplink grant.

24. The apparatus of claim 23, wherein the downlink control message is a HARQ acknowledgement from the base station.

25. The apparatus of claim 23, wherein the downlink control message is a retransmission grant from the base station.

26. A method of wireless communication, comprising:
- transmitting, by a base station to a wireless communication device, configuration information for switching from a first configured downlink control message monitoring duration to a second configured downlink control message monitoring duration;
- communicating, by the base station with the wireless communication device, a communication signal based on the configuration information at a first time between an expiration of the second configured downlink control message monitoring duration and an expiration of the first configured downlink control message monitoring duration; and
- transmitting, by the base station to the wireless communication device during a margin time at which the wireless communication device is monitoring, the downlink control information, wherein the margin time begins at an end of the second configured downlink control message monitoring duration.

27. The method of claim 26, wherein switching of the downlink control message configured monitoring duration includes switching from a first configured monitoring duration to a second configured monitoring duration, wherein the first configured downlink control message monitoring duration is longer than the second configured downlink control message monitoring duration.

28. The method of claim 27, wherein the configuration information includes a COT indicator indicating the first and second configured downlink control message monitoring durations.

29. An apparatus comprising:
a transceiver configured to:
- transmit to a wireless communication device, configuration information for switching from a first configured downlink control message monitoring duration to a second configured downlink control message monitoring duration;
- communicate, with the wireless communication device, a communication signal based on the configuration information at a first time between an expiration of the second configured downlink control message monitoring duration and an expiration of the first configured downlink control message monitoring duration; and
- transmit, to the wireless communication device during a margin time in which the wireless communication device is monitoring, the downlink control message, wherein the margin time begins at an end of the second configured downlink control message monitoring duration.

30. The apparatus of claim 29, wherein the configuration information includes a network activity indication signal.

* * * * *